(12) United States Patent
Einhaus et al.

(10) Patent No.: US 10,405,318 B2
(45) Date of Patent: Sep. 3, 2019

(54) PDSCH PRECODING ADAPTATION FOR LTE IN UNLICENSED BANDS

(71) Applicant: Panasonic Intellectual Property Corporation of America, Torrance, CA (US)

(72) Inventors: Michael Einhaus, Hessen (DE); Jan Ohlhorst, Bayern (DE); Masayuki Hoshino, Kanagawa (JP); Alexander Golitschek Edler Von Elbwart, Hessen (DE)

(73) Assignee: PANASONIC INTELLECTUAL PROPERTY CORPORATION OF AMERICA, Torrnce, CA (US)

( * ) Notice: Subject to any disclaimer, the term of this patent is extended or adjusted under 35 U.S.C. 154(b) by 45 days.

(21) Appl. No.: 15/667,200

(22) Filed: Aug. 2, 2017

(65) Prior Publication Data

US 2017/0332368 A1 Nov. 16, 2017

Related U.S. Application Data

(63) Continuation of application No. PCT/JP2016/000782, filed on Feb. 16, 2016.

(30) Foreign Application Priority Data

Mar. 24, 2015 (EP) .................................... 15160554

(51) Int. Cl.
*H04W 72/04* (2009.01)
*H04L 25/03* (2006.01)
(Continued)

(52) U.S. Cl.
CPC ........ *H04W 72/048* (2013.01); *H04B 7/0456* (2013.01); *H04B 7/0608* (2013.01);
(Continued)

(58) Field of Classification Search
CPC .. H04B 7/0417; H04B 7/0452; H04B 7/0456; H04B 7/0608; H04B 7/0617;
(Continued)

(56) References Cited

U.S. PATENT DOCUMENTS 9,564,957 B2 * 2/2017 Balraj .................. H04B 7/0617
9,660,712 B2 * 5/2017 Park ...................... H04W 16/28
(Continued)

FOREIGN PATENT DOCUMENTS

WO 2015/023910 A2 2/2015

OTHER PUBLICATIONS

Panasonic, Hidden and Exposed Station Statistics and Implications in LAA Scenarios, Mar. 26, 2015, 3GPP TSG-RAN WG1 LAA Ad-Hoc Meeting, Tdoc: R1-151018 (Year: 2015).*
(Continued)

*Primary Examiner* — Eric Nowlin
(74) *Attorney, Agent, or Firm* — Seed IP Law Group LLP

(57) ABSTRACT

The present disclosure relates to a method for transmitting and receiving a beamformed data transmission transmitted from a radio base station to a user equipment over an unlicensed band. The data transmission is transmitted by the radio base station within one or more resource blocks of a subframe, each resource block being composed of a plurality of resource elements. The beamformed data transmission is generated by the radio base station by 1) applying a first precoding for generating a beam directionality towards the user equipment to a subset of all the resource elements used for transmitting the data transmission in the subframe, and 2) applying a second precoding, different from the first precoding, to the remaining resource elements used for transmitting the data transmission in the subframe so as to achieve a radiation pattern different from the beam directionality towards the user equipment.

15 Claims, 25 Drawing Sheets

(51) Int. Cl.
*H04B 7/0456* (2017.01)
*H04B 7/06* (2006.01)
*H04L 5/00* (2006.01)
*H04W 16/28* (2009.01)
*H04W 74/08* (2009.01)

(52) U.S. Cl.
CPC ............ *H04L 5/005* (2013.01); *H04L 5/0026* (2013.01); *H04L 25/03828* (2013.01); *H04W 16/28* (2013.01); *H04B 7/0639* (2013.01); *H04L 5/001* (2013.01); *H04W 74/0808* (2013.01)

(58) Field of Classification Search
CPC .... H04B 7/0619; H04B 7/0626; H04B 7/063; H04B 7/0639; H04L 1/0026; H04L 5/0023; H04L 5/0026; H04L 5/005; H04L 5/0092; H04L 25/038328; H04L 25/0391; H04W 16/28; H04W 72/048
See application file for complete search history.

(56) References Cited

U.S. PATENT DOCUMENTS

| | | | | |
|---|---|---|---|---|
| 9,787,376 | B2* | 10/2017 | Zhu | H04B 7/0617 |
| 9,942,931 | B2* | 4/2018 | Zhu | H04W 8/005 |
| 10,200,168 | B2* | 2/2019 | Liu | H04L 5/0044 |
| 2009/0225728 | A1* | 9/2009 | Tao | H04B 7/043 370/337 |
| 2012/0155561 | A1 | 6/2012 | Seo et al. | |
| 2013/0114524 | A1* | 5/2013 | Sirotkin | H04L 1/0026 370/329 |
| 2013/0170387 | A1* | 7/2013 | Wang | H04W 4/70 370/252 |
| 2015/0071220 | A1 | 3/2015 | Luo et al. | |
| 2015/0195020 | A1* | 7/2015 | Zhu | H04B 7/0617 370/329 |
| 2015/0372737 | A1* | 12/2015 | Park | H04W 16/28 370/329 |
| 2016/0173177 | A1* | 6/2016 | Zhu | H04W 8/005 370/329 |
| 2016/0191131 | A1* | 6/2016 | Balraj | H04B 7/0617 375/267 |
| 2016/0344575 | A1* | 11/2016 | Gong | H04J 11/0053 |
| 2016/0353452 | A1* | 12/2016 | Chen | H04L 5/0048 |
| 2017/0063503 | A1* | 3/2017 | Liu | H04L 5/0044 |
| 2018/0062715 | A1* | 3/2018 | Li | H04B 7/04 |
| 2018/0198582 | A1* | 7/2018 | Andersson | H04L 5/0007 |
| 2018/0279352 | A1* | 9/2018 | Chuang | H04B 7/0473 |
| 2018/0309526 | A1* | 10/2018 | Zhang | H04B 7/0617 |
| 2018/0331727 | A1* | 11/2018 | John Wilson | H04L 5/0048 |
| 2018/0338254 | A1* | 11/2018 | Ho | H04W 24/10 |
| 2018/0343595 | A1* | 11/2018 | da Silva | H04J 11/0073 |
| 2019/0029071 | A1* | 1/2019 | Moon | H04L 5/005 |
| 2019/0037418 | A1* | 1/2019 | Gunasekara | H04W 24/02 |

OTHER PUBLICATIONS

Panasonic, Impact of LAA Beamforming on LBT Behaviour, Apr. 24, 2015, 3GPP TSG-RAN WG1 Meeting 80bis, Tdoc: R1-151676 (Year: 2015).*

Panasonic, Impact of LAA Beamforming on LBT Behaviour, May 29, 2015, 3GPP TSG-RAN WG1 Meeting 81, Tdoc: R1-152920 (Year: 2015).*

Panasonic, Impact of LAA Beamforming on LBT Behaviour, Aug. 28, 2015, 3GPP TSG-RAN WG1 Meeting 82, Tdoc: R1-153976 (Year: 2015).*

Panasonic, Impact of LAA Beamforming on LBT Behaviour, Oct. 9, 2015, 3GPP TSG-RAN WG1 Meeting 82bis, Tdoc: R1-155353 (Year: 2015).*

International Search Report of PCT application No. PCT/JP2016/000782 dated May 17, 2016.

3GPP TSG RAN WG1 Meeting #78bis, R1-144157, "Design overview on LAA", Oct. 6, 2014.

3GPP TS 36.211, V12.4.0, "3rd Generation Partnership Project; Technical Specification Group Radio Access Network; Evolved Universal Terrestrial Radio Access (E-UTRA); Physical channels and modulation (Release 12)", Jan. 6, 2015.

3GPP TSG RAN WG1 Meeting #78bis, R1-144348 (R1-144226), "Regulatory Requirements for Unlicensed Spectrum", Oct. 6, 2014.

ETSI EN 301 893, V1.8.0, "Broadband Radio Access Networks (BRAN); 5GHz high performance RLAN; Harmonized EN covering the essential requirements of article 3.2 of the R&TTE Directive", Jan. 2015.

3GPP TS 36.212, V12.3.0, "3rd Generation Partnership Project; Technical Specification Group Radio Access Network; Evolved Universal Terrestrial Radio Access (E-UTRA); Multiplexing and channel coding (Release 12)", Jan. 6, 2015.

3GPP TS 36.331, V12.4.0, "3rd Generation Partnership Project; Technical Specification Group Radio Access Network; Evolved Universal Terrestrial Radio Access (E-UTRA); Radio Resource Control (RRC); Protocol specification (Release 12)", Jan. 5, 2015.

3GPP TS 36.213, V12.4.0, "3rd Generation Partnership Project; Technical Specification Group Radio Access Network; Evolved Universal Terrestrial Radio Access (E-UTRA); Physical layer procedures (Release 12)", Jan. 7, 2015.

Daisuke Nojima et al., "Performance Evaluation for Multi-User MIMO IEEE 802.11ac Wireless LAN System", ICACT2012, pp. 804-808, Feb. 19, 2012.

Communication pursuant to Article 94(3) EPC, dated Feb. 20, 2018, for the related European Patent Application No. 15160554.0-1218, 6 pages.

MediaTek Inc., "Discussions on LAA frame structure design and LAA-WIFI coexistence," R1-150577, 3GPP TSG RAN WG1 Meeting #80, Agenda Item: 7.2.3.3, Athens, Greece, Feb. 9-13, 2015, 4 pages.

* cited by examiner

PDSCH PRECODING ADAPTATION FOR LTE IN UNLICENSED BANDS

BACKGROUND

1. Technical Field

The present disclosure relates to methods for transmitting and receiving a beamformed data transmission transmitted from a radio base station to a user equipment. The present disclosure is also providing the user equipment and base station for participating in the methods described herein.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (ON) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} N^{RB}_{SC}$, subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $N^{min,DL}_{RB} \leq N^{DL}_{RB} \leq N^{max,DL}_{RB}$, where $N^{min,DL}_{RB} \leq_{RB} = 6$ and $N^{max,DL}{}_{RB}=110$ are respectively the smallest and the largest downlink bandwidths, supported by the current version of the specification. $N^{RB}{}_{SC}$ is the number of subcarriers within one resource block. For normal cyclic prefix subframe structure, $N^{RB}{}_{SC}=12$ and $N^{DL}{}_{symb}=7$.

Assuming a multi-carrier communication system, e.g., employing OFDM, as, for example, used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see, for example, 3GPP TS 36.211, "Evolved Universal Terrestrial Radio Access (E-UTRA); Physical Channels and Modulation (Release 8)" (3GPP TS 36.211, "Evolved Universal Terrestrial Radio Access (E-UTRA); Physical Channels and Modulation", version 12.4.0), section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe are called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPF LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE, Conversely, the number of uplink component carriers that can be configured depends on the uplink aggregation capability of the UE. It may currently not be possible to configure a mobile terminal with more uplink component carriers than downlink component carriers.

In a typical TDD deployment the number of component carriers and the bandwidth of each component carrier in uplink and downlink is the same. Component carriers originating from the same eNodeB need not provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier, A transport block and its potential HARQ retransmissions need to be mapped on the same component carrier.

When carrier aggregation is configured, the mobile terminal only has one RRC connection with the network, At RRC connection establishment/re-establishment, one cell provides the security input (one ECGI, one PCI and one ARFCN) and the non-access stratum mobility information (e.g., TAI) similarly as in LTE Rel, 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
- For each SCell the usage of uplink resources by the UE in addition to the downlink ones is configurable (the number of DL SCCs configured is therefore always larger or equal to the number of UL SCCs, and no SCell can be configured for usage of uplink resources only)
- The downlink PCell cannot be de-activated, unlike SCells
- Re-establishment is triggered when the downlink PCell experiences Rayleigh fading (RLF), not when downlink SCells experience RLF
- Non-access stratum information is taken from the downlink PCell
- PCell can only be changed with handover procedure (i.e., with security key change and RACH procedure)
- PCell is used for transmission of PUCCH
- The uplink PCell is used for transmission of Layer 1 uplink control information
- From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-819 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 3, with a licensed PCell, licensed SCell 1 and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as, for example, voice and video, while an SCell on unlicensed spectrum might yield, depending on the scenario, to some extent significant QoS reduction due to inevitable coexistence with other RATS.

It has been agreed during RAN1#78bis that the LAA investigation at 3GPP will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which depend on region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, September 2014, incorporated herein by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5 GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0, incorporated herein by reference.

Following this European regulation regarding LBT, devices have to perform a Clear Channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe, 20 μs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Considering the different regulatory requirements, it is apparent that the LTE specification for operation in unlicensed bands will require several changes compared to the current Rel-12 specification that is limited to licensed band operation.

Reference and Synchronization Signals

A UE wishing to access an LTE cell must first undertake a cell search procedure, which consists of a series of synchronization states by which the UE determines time and frequency parameters that are necessary to demodulate the downlink and to transmit uplink signals with the correct timing. The UE also acquires some critical system parameters.

The cell search procedure begins with a synchronization procedure which makes use of two specially designed physical signals that are broadcast by the eNodeB in each cell: the Primary Synchronization Signal (PSS) and the Secondary Synchronization Signal (SSS). PSS/SSS are transmitted periodically, twice per 10 ms radio frame, on the six center resource block pairs in the frequency domain with a fixed interval of 5 ms, thus enabling the frequency mapping of the synchronization signals to be invariant with respect to the system bandwidth (which can vary from 6 to 110 RBs to suit channel bandwidths between around 1.4 MHz and 20 MHz); this allows the UE to synchronize to the network without any a priori knowledge of the allocated bandwidth. In an FDD cell, the PSS is always located in the last OFDM symbol of the first and eleventh slots of each radio frame, thus enabling the UE to acquire the slot boundary timing independently of the cyclic prefix length. The SSS is located in the symbol immediately preceding the PSS, a design choice enabling coherent detection of the SSS relative to the PSS, based on the assumption that the channel coherence duration is significantly longer than one OFDM symbol. In a TDD cell, the PSS is located in the third symbol of the third and thirteenth slots, while the SSS is located three symbols earlier; coherent detection can be used on the assumption that the channel coherence time is significantly longer than four OFDM symbols. In the case of multiple transmit antennas being used at the eNodeB, the PSS and SSS are always transmitted from the same antenna port in any given subframe, while between different subframes they may be transmitted from different antenna ports in order to benefit from time-switched antenna diversity.

Both coherent and non-coherent protection may play part in the synchronization procedures: in the case of the PSS, non-coherent detection is used, while for SSS-sequence detection, coherent or non-coherent techniques can be used. From a conceptual point of view a coherent detector takes advantage of knowledge of the channel while a non-coherent detector uses an optimization metric corresponding to the average channel statistics.

More information in this respect can be found in the 3GPP technical standard TS 36.211, current version 12.4.0, clause 6.11 "Synchronization signals", incorporated herein by reference.

LTE supports multiple downlink reference signals that are used, e.g., for the purpose of channel measurements and demodulation on UE side. Mobile radio channels usually exhibit multipath fading, which causes Inter-Symbol-Interference (ISI) in the received signal. In order to remove ISI, various kinds of equalization and detection algorithms can be utilized, which may or may not exploit knowledge of the Channel Impulse Response (CIR). When the detection method exploits general knowledge it is generally said to be coherent; otherwise, it is called non-coherent. Coherent detection can make use of both amplitude and phase information carried by the complex signals, and not of only amplitude information as with non-coherent detection. Optimal reception by coherent detection therefore typically requires accurate estimation of the propagation (radio) channel. In order to implement coherent detection, overhead is needed so as to be able to estimate the channel. A common and simple way to estimate the channel is to exploit known signals (i.e., reference signals) which do not carry any data, but which therefore cause a loss in spectral efficiency. LTE (in common with earlier system such as GSM and UMTS) is a coherent communication system, for which purpose known reference signals (RSs) are inserted into the transmitted signal structure. Reference signals are typically mapped to specific resource elements (REs) of the two-dimensional lattice in time and frequency (see FIG. 2).

Since reference signals are sent only on particular OFDM resource elements (i.e., on particular OFDM symbols on particular subcarriers), general estimates for the resource elements which do not bear resource signals have to be computed via interpolation.

In the LTE downlink the following different types of reference signals are currently defined:
  cell specific reference signals (CRS) (also referred to as common reference signals, as they should be available to all UEs in a cell and no UE specific processing is applied to them)
  UE specific reference signals, which may be embedded in the data for specific UEs (also known as demodulation reference signals, DMRSs)
  MBSFN-specific reference signals, which are used only for multimedia broadcast single frequency network (MBSFN) operation
  positioning reference signals (PRS) which may be embedded in certain positioning subframes for the purpose of UE-location measurements
  channel state information (CSI) reference signals (CSI-RS), introduced in Release 10 specifically for the purpose of estimating the downlink channel state and not for data demodulation
  discovery reference signals (DRS), introduced in Release 12 for the purpose of cell discovery and radio resource management (RRM) measurement enhancements in case of small-cell dormancy.

Each reference signal pattern is transmitted from an antenna port at the eNodeB. An antenna port may in practice be implemented either as a single physical transmit antenna, or as a combination of multiple physical antenna elements. In either case, the signal transmitted from each antenna port is not designed to be further deconstructed by the UE receiver: the transmitted reference signals corresponding to a given antenna port defines the antenna port from the point of view of the UE, and enables the UE to derive a channel estimate for all data transmitted on that antenna port, i.e., regardless of whether it represents a single radio channel from one physical antenna or a composite channel from a multiplicity of physical antenna elements together comprising the antenna port. The designations of the antenna ports available in LTE are summarized below:
  antenna ports 0-3: cell-specific reference signals
  antenna port 4: MBSFN
  antenna port 5: UE-specific reference signals for single-layer beamforming
  antenna port 6; positioning reference signals
  antenna ports 7-8: UE-specific reference signals for dual-layer beamforming
  antenna ports 9-14: UE-specific reference signals for multilayer beamforming
  antenna ports 15-22: CSI reference signals Detailed information on the various reference signals can be found in the 3GPP technical standard TS 36.211, current version 12.4.0, clause 6.10, incorporated herein by reference. In the following brief summaries of the various reference signals are given.

CRS—Cell-Specific, Common, Reference Signals

The cell specific reference signals enable the UE to determine the phase reference for demodulating the downlink control channels and the downlink data in most transmission modes of the Physical Downlink Shared CHannel (PDSCH). If the UE-specific precoding is applied to the PDSCH data symbols before transmission (e.g., in PDSCH transmission notes 3 to 6), downlink control signaling is provided to inform the UE of the corresponding phase adjustment it should apply relative to the phase reference provided by the cell-specific reference signals; this is done by use of a precoding matrix indicator. The cell-specific reference signals are also used by the UEs to generate channel state information feedback.

In LTE the arrangement of the resource elements on which the cell-specific reference signals R0, R1, R2, and R3 are transmitted is illustrated in FIGS. 4, 5, and 6, respectively referring to the CRS R0, R1, R2, and R3 of one, two, and four antenna ports 0-3, where a normal cyclic prefix is assumed. Correspondingly, up to four cell-specific antenna ports numbered 0-3 may be used by an LTE eNodeB, thus requiring the UE to derive up to 4 separate channel estimates. For each antenna port, a different reference signal pattern has been designed, with particular attention having been given to the minimization of the intra-cell interference between the multiple transmit antenna ports. When a resource element is used to transmit a reference signal on one antenna port, the corresponding resource element on the other antenna ports is set to 0 to limit the interference. The common reference signals (CRS) are transmitted in all subframes and all resource block pairs, and are used for channel state measurements, demodulation reference and cell detection. In the frequency direction, there is one reference signal every 6 subcarriers on each OFDM symbol that includes reference symbols, but the reference symbols are staggered so that within each resource block there is one reference symbol every three subcarriers, as apparent from FIG. 4.

DMRS UE-Specific Demodulation Reference Signals

In LTE, UE-specific reference signals may be transmitted in addition to the cell-specific reference signals described above if the UE is configured (for example, by higher-layer RRC signaling) to receive its downlink PDSCH data in transmission mode 7. The UE-specific reference signals are embedded only in those resource blocks to which the PDSCH is mapped for those UEs (i.e., in the PDSCH allocation RBs). If the UE-specific reference symbols are transmitted, the UE is expected to use them to derive the channel estimate for demodulating the data in the corresponding PDSCH resource blocks. Since the same precoding is applied to the UE-specific reference signals as to the PDSCH data symbols, there is no need for signaling to inform the UE of the precoding applied. Therefore, the UE-specific reference signals are treated as being transmitted using a distinct antenna port (number 5) with its own channel response from the eNodeB to the UE. FIG. 7 correspondingly discloses the transmission pattern of DMRS transmitted from antenna port 5, where a normal cyclic prefix is assumed.

A typical usage of the UE-specific reference signals is to enable beamforming of the data transmissions to specific UEs. For example, rather than using the physical antennas used for transmission of the other (cell-specific) antenna ports, the eNodeB may use a correlated array of physical antenna elements to generate a narrow beam in the direction of a particular UE. That beam will experience a different channel response between the eNodeB and the UE, thus favouring the use of UE-specific reference signals to enable the UE to demodulate the beamformed data coherently. Beamforming will be discussed in more detail later.

Moreover, a new design for UE-specific reference signals is defined as of Release 9 of the LTE specifications in order to extend UE-specific reference signal support to dual-layer transmissions. This includes the transmission of two spatial layers to one UE, or a single-layer transmission to each of two UEs as a multiuser multiple input multiple output (MU-MIMO) transmission. The reference signals are positioned in the earliest and latest-available pairs of OFDM symbols that avoid collision with the cell-specific reference signals. Pairs of resource elements are used so that the UE-specific reference signals for the two layers can be code-multiplexed. The UE-specific reference signals for the two layers using this pattern are termed antenna ports 7 and 8. A UE configured to use the Release 9 dual-layer UE-specific reference signals is configured in PDSCH transmission mode 8.

CSI-RS—Channel State Information Reference Signals

As explained above, LTE Release 9 supports two-layer beamforming spatial multiplexing using precoded UE-specific reference signals, which enable non-codebook-based precoding to be used. For LTE-Advanced, downlink SU-MIMO transmission is extended to support up to 8 spatial layers, and for this purpose the precoded UE-specific reference signal approach is further developed for the data and the modulation. In order to enable the UE to estimate and feedback the channel state information corresponding to up to 8 antenna ports across a wide bandwidth, new reference signals, referred to as CSI-RS, are provided, which thus assist the eNodeB in its precoding operations. Since CSI-RS are used only for feedback purposes they can be sparse and incur only a small overhead.

The CSI-RS are used for channel state measurements instead of or in addition to CRS depending on the configuration. In contrast to CRS, CSI-RS are not transmitted in all subframes and in all resource block pairs, but within a configured subset of subframes and resource block pairs.

FRS—Positioning Reference Signals

The positioning reference signals (PRS) have been introduced in LTE Release 9 so as to increase the probability that the UE can detect sufficient neighbor cells. Positioning subframes reduce the interference and increase the reference symbol energy: typically they do not carry any physical downlink shared channel (PDSCH) data but provide positioning reference signals in addition to the cell-specific reference signals. The PRS pattern is designed so that it never overlaps with the PDCCH, nor with the cell-specific reference signals of any other antenna port. Further, in contrast to CRS, PRS are not transmitted in all subframes, but in configured groups of consecutive subframes.

DRS—Discovery Reference Signals

The discovery reference signals (DRS) have been introduced in LTE Release 12 and consist in general of a configured combination of PSS/SSS, CRS, PRS, and CSI-RS together with quasi co-location information (QCI) regarding the different reference symbols. The specification of the resource allocation patterns and signal waveforms of the individual DRS components (PSS/SSS, CRS, etc.) is not changed.

Transmission Direction of Reference and Synchronization Signals

Typically, the reference and synchronization signals (e.g., PSS, SSS, CRS, CSI-RS, DRS) are transmitted in an omni-directional fashion (i.e., with an omni-directional radiation pattern) so as to cover the whole cell area and thus reach all UEs. Correspondingly, the reference and synchronization signals can be transmitted, e.g., from a single antenna port.

Exceptionally, UE-specific reference signals, such as the DMRS, which are precoded together with the PDSCH transmissions, may not be transmitted in an omni-directional fashion, particularly when using beamforming for the PDSCH transmission; the same precoding vector/matrix is applied to the DMRS and the PDSCH transmission.

Furthermore, in sectorized deployment scenarios, e.g., where each of different eNodeBs controls only one sector of a cell (e.g., 120°), the reference and synchronization signals would typically also only be transmitted so as to cover that sector (e.g., 120°) by use of sectorized antennas. Covering only certain areas or directions of a cell with reference signals (such as, for example, certain CSI-RS ports) by use of corresponding precoding for these reference signals is possible as well.

MIMO, Precoding and Beamforming

LTE was the first global mobile cellular system to be designed with Multiple Input Multiple Output (MIMO). While traditional wireless communications (Single-Input Single-Output, SISO) exploit time or frequency domain pre-processing and decoding of the transmitted and received data respectively, the use of additional antenna elements at either the base station or the user equipment side opens an extra spatial dimension to signal precoding and detection. Space-time processing methods exploit this dimension with the aim of improving the link's performance, such as the error rate, the communication data rate, the coverage area, and spectral efficiency. MIMO techniques basically offer three advantages over their SISO counterparts, which are diversity gain, array gain, and spatial multiplexing gain.

The optimal way of communicating over the MIMO channel involves a channel-dependent precoder, which fulfills the roles of both transmitter beamforming and power allocation across the transmitted streams, and a correspondingly-matching receiver beamforming structure. Full channel knowledge is therefore required at the transmitter side for this mode to be fully applicable. At the receiver, channel estimation is typically performed over a finite sample of reference signals, as presented before. In case of transmitter beamforming and MIMO precoding, the transmitter then has to acquire this knowledge from the receiver usually through a limited feedback link. As a consequence, one of the most difficult challenges in making MU-MIMO practical for cellular applications, and particularly for an FDD system, is devising feedback mechanisms that allow for accurate OSI to be delivered efficiently by the UEs to the base station.

FIG. 8 is an overview of the general physical channel processing for the downlink physical channels, as taken from the 3GPP Technical Standard TS 36.211, current version 12.4.0, clause 6.3. The general structure is applicable to more than one physical channel. The baseline signal representing a downlink physical channel is defined in terms of the following steps:

scrambling of coded bits in each of the codewords to be transmitted on a physical channel modulation of scrambled bits to generate complex-valued modulation symbols mapping of the complex-valued modulation symbols onto one or several transmission layers precoding of the complex-valued modulation symbols on each layer for transmission on the antenna ports mapping of complex-valued modulation symbols for each antenna port to resource elements generation of complex-valued time-domain OFDM signal for each antenna port As can be appreciated therefrom the precoder is usually located before the resource element mapper such that the precoding is performed per resource element. However, in LTE systems the precoding of a PDSCH transmission based on CRS remains the same at least within a subframe of the PDSCH, i.e., all resource elements used within a subframe for transmitting the PDSCH transmission are preceded with the same precoding matrix. The corresponding DCI formats for CRS-based PDSCH transmission do not support the indication of different precoding matrices (PMIS) for different resource blocks or resource elements, see subclause 5.3.3.1 of the technical standard 3GPP TS 36.212 (3GPP TS 36.212, "Multiplexing and channel coding", version 12.3.0) for the DCI format specification.

The use of different precoders for different resource elements within a resource block is not supported by the current LTE specification.

Detailed information on the steps can be found in the above identified technical standard TS 36.211 and its corresponding subclauses 6.3.1-6.3.4, incorporated herein by reference. For the purposes of the present application, the step of precoding is presented in more detail.

In this context, a spatial layer is the term used in LTE for one of the different streams generated by spatial multiplexing. A layer can be described as a mapping of symbols onto the transmit antenna ports. Each layer is identified by a precoding vector of size equal to the number of transmit antenna ports and can be associated with a particular radiation pattern. The rank of the transmission is the number of layers transmitted. A codeword is an independently encoded data block, corresponding to a single transport block delivered from the medium access control (MAC) layer in the transmitter to the physical layer, and protected with a CRC (cyclic redundancy code). For ranks greater than 1, two codewords can be transmitted; the number of codewords is always less than or equal to the number of layers, which in turn is always less than or equal to the number of available antenna ports.

Beamforming of a spatial transmission layer is done in order to increase the SINR level on the receiver side by concentrating the transmission power in the direction of the strongest radio channel path. In other words, by concentrating the eNodeB power in the direction(s) in which the radio channel offers the strongest path to reach the UE, the cell coverage of the eNodeB can be extended. This is typically facilitated by the use of closely-spaced antenna element arrays for creating directional transmissions. The signal phase setting on the different antenna elements is done in a way so that the transmitted signals add up constructively on the receiver side. This phase adaptation per antenna element is called precoding.

The PDSCH transmission modes for closed-loop spatial multiplexing use precoding from a defined codebook to form the transmitted layers. Each codebook consists of a set of predefined precoding matrices, with the size of the set being a trade-off between the number of signaling bits required to indicate a particular matrix in the codebook and the suitability of the resulting transmitted beam direction. In the case of closed loop spatial multiplexing, a UE feeds back to the eNodeB the index of the most desirable entry from a predefined codebook, where the preferred precoder is the matrix which would maximize the capacity based on the receiver capabilities.

FIG. 9 shows the exemplary signal transmission chain with precoding for two transmit antenna elements and one receive antenna element. The modulated data symbol is transmitted over the two transmit antenna elements, where phase and amplitude on each transmit antenna port is adapted by the precoder. Both transmit signals experience phase and amplitude change by the radio channel, and the receiver sees the superposition of both antenna element signals. The precoding on the transmitter side is therefore transparent for the UE; it does not have to be aware of the number of used antenna elements and corresponding phase settings. The receiver detects just the sum signal that is given by the superposition of the individual antenna element signals. A specific phase and amplitude combination for both antenna elements may be called precoding vector in the following.

It should be also noted that beamforming is currently only defined for the PDSCH and not to the downlink control channels, such that, although the range of a given data rate on the PDSCH can be extended by beamforming, the overall cell coverage may still be limited by the range of the control channels unless other measures are taken.

LTE supports two kinds of precoding for PDSCH transmissions; (a) closed-loop precoding and (b) open-loop precoding.

Closed-Loop Precoding/Beamforming

In case of closed-loop precoding, the receiver (UE) suggests a certain precoding vector from a set of supported precoding vectors that can be used for the PDSCH transmissions. This precoder selection is done based on, e.g., channel state information (CSI) estimations that are derived from reference signal measurements. The precoding vector suggestion may be part of the CSI reporting that is specified for LTE, where the precoding selection is indicated by the UE in form of a PMI (precoding matrix indicator) that refers to a specific precoding vector within a specified codebook. These codebooks are defined, e.g., in subclause 6.3.4 of the technical standard 3GPP TS 36.211, current version 12.4.0, incorporated herein by reference. The precoding matrix indicator (PMI) definition is given in subclause 7.2.4 of the technical standard 3GPP TS 36.213, current version 12.4.0, incorporated herein by reference.

The reference signals that are used for the purpose of CSI reporting can be either common reference signals (CRS), or additionally channel state information reference signals (CSI-RS). Which of them will be used for measurements depends, e.g., on the corresponding reporting mode configuration. More details regarding the CSI-RS configuration can be found in subclause 7.2.5 of the technical standard 3GPP TS 36.213, current version 12.4.0, incorporated herein by reference.

Based on the PMI report from UE side, the eNB selects a precoding vector for the PDSCH transmission and explicitly informs the UE about the used precoding vector in form of an PMI indication within the DCI that is transmitted on the downlink control channel (PDCCH or EPDCCH) for the PDSCH data transmission. This means that the eNB informs the UE about the phase adjustments (precoding) on the transmitter side. These adjustments have to be applied on the receiver side relative to the phase reference provided by the CRS. The CRS represent in this case the different individual antenna elements that are superimposed for the (beamformed) PDSCH transmission.

The precoder selection in case of closed-loop precoding is restricted to a fixed number of entries in a configured precoder codebook.

Open-Loop Precoding/Beamforming

In case of open-loop precoding, there is no specific PMI reporting applied, i.e., precoding vectors are not explicitly suggested by the UE for downlink data transmissions. Rather, the precoding vector selection on eNB side is based, e.g., on measurements of particular sounding reference signals (SRS) transmitted in uplink direction. The precoder is furthermore not indicated to the receiving UE in form of a PMI within the DCI related to the PDSCH, but has to be derived on UE side by evaluation of UE-specific demodulation reference signals (DMRS). These DMRS will be transmitted within the PDSCH allocation. If they are transmitted, the UE is expected to use them as phase and amplitude reference for the PDSCH demodulation. The same precoding is applied for PDSCH and corresponding DMRS, for which reason it is not required to inform the receiving UE about the applied phase adaptation (i.e., precoding) of the individual antenna elements used for beamforming.

SUMMARY

One non-limiting and exemplary embodiment provides an improved method for transmitting and receiving a beamformed data transmission over an unlicensed band, In one general aspect, the techniques disclosed here feature a method for transmitting and receiving a beamformed data transmission transmitted from a radio base station to a user equipment over an unlicensed band in a mobile communication system. The data transmission is transmitted by the radio base station within one or more resource blocks of a subframe where each resource block is composed of a plurality of resource elements. The beamformed data transmission is generated by the radio base station by 1) applying a first precoding for generating a beam directionality towards the user equipment to a subset of all the resource elements used for transmitting the data transmission in the subframe, and 2) applying a second precoding, different from the first precoding, to the remaining resource elements used for transmitting the data transmission in the subframe so as to achieve a radiation pattern different from the beam directionality towards the user equipment.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

A mobile station or mobile node or user terminal or user equipment is a physical entity within a communication network, One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "beamformed data transmission" as used in the set of claims and in the application is to be broadly understood as a transmission which power emission is focused in a particular beam-like direction.

The term "unlicensed band" as used in the set of claims and in the application is to be understood in the context of 3GPP as of Release 12/13, vis-a-vis licensed bands.

As discussed in the background section, the LTE specification for operation in unlicensed bands will require several changes compared to the current Release-12 specification for licensed band operation. The co-existence with WiFi on unlicensed bands at 5 GHz is one of the most critical topics. As stipulated by the European Regulation Requirements, nodes operating on unlicensed bands are to perform Listen-Before-Talk before accessing the channel, which is based, e.g., on the reception power level at the node over the whole frequency band.

The precoding/beamforming of a transmitting device steers the transmission power into a certain spatial direction while less or basically no power is emitted into other spatial directions, which means that listening devices performing CCA experience different channel reception powers depending on their location with respect to the beam transmitted from the transmitting device.

Figure 10:
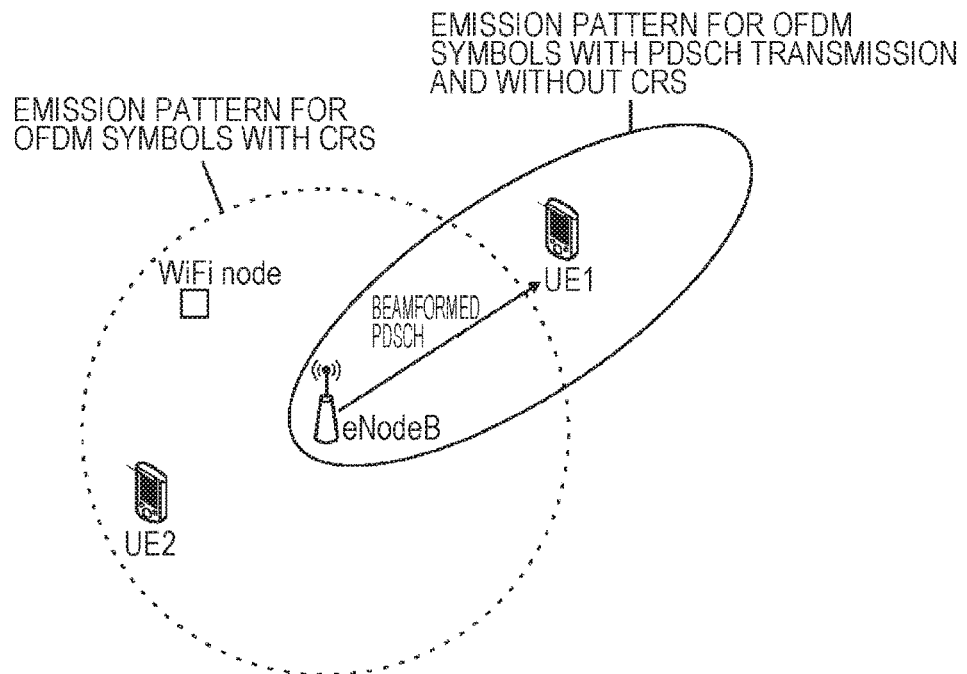
FIG. 10 illustrates a scenario where an eNodeB performs a beamformed PDSCH data transmission towards UE1, and illustrates the corresponding power radiation pattern of OFDM symbols carrying the data transmission.

FIG. 10 illustrates an exemplary scenario with one eNodeB, two LTE UEs UE1 and UE2, and one WiFi node. For this exemplary scenario it is assumed that the eNodeB performs a beamformed/precoded PDSCH transmission to UE1; the corresponding directionality of the power radiation pattern of the beamformed PDSCH transmission towards UE1 is schematically illustrated in FIG. 10 for an OFDM symbol that includes only resource elements used for the (beamformed) PDSCH transmission; see solid-lined beam in FIG. 10 which represents the total energy of the beamformed transmission of an OFDM symbol over the whole frequency range.

It is further assumed that the eNodeB transmits reference signals in its cell, at least the cell-specific reference signals (CRS), which in this case are assumed to be transmitted in an omni-directional fashion. It is also assumed that the CRS are used for transmitting the PDSCH, such that UE1 detects the phase reference based on the transmitted CRS. FIG. 10 also illustrates schematically the omni-directional radiation pattern of OFDM symbols with resource elements transporting the CRS, but without the PDSCH, see dashed-line circle in FIG. 10 which shall represent the total energy of an OFDM symbol with CRS over the whole frequency range. UE1 and UE2 use the CRS also for CSI measurements and reporting, and other RRM measurements.

Figure 11:
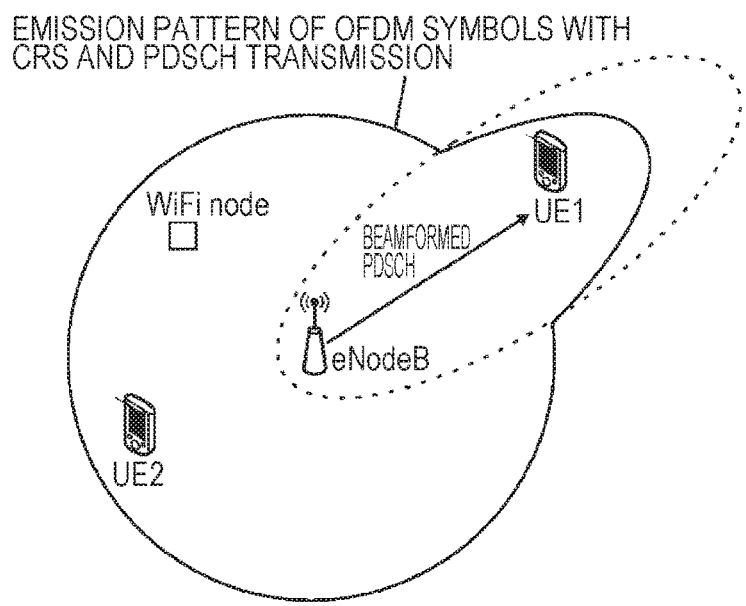
FIG. 11 illustrates the same scenario as in FIG. 10, but illustrates the power radiation pattern of OFDM symbols carrying both the PDSCH data transmission and CRS.

FIG. 11, which also assumes the same scenario as in FIG. 10, schematically illustrates with a solid line the radiation pattern for OFDM symbols including both CRS and PDSCH. The dashed-line beam corresponds to the radiation pattern of the respective data transmission as depicted in FIG. 10.

Figure 12:
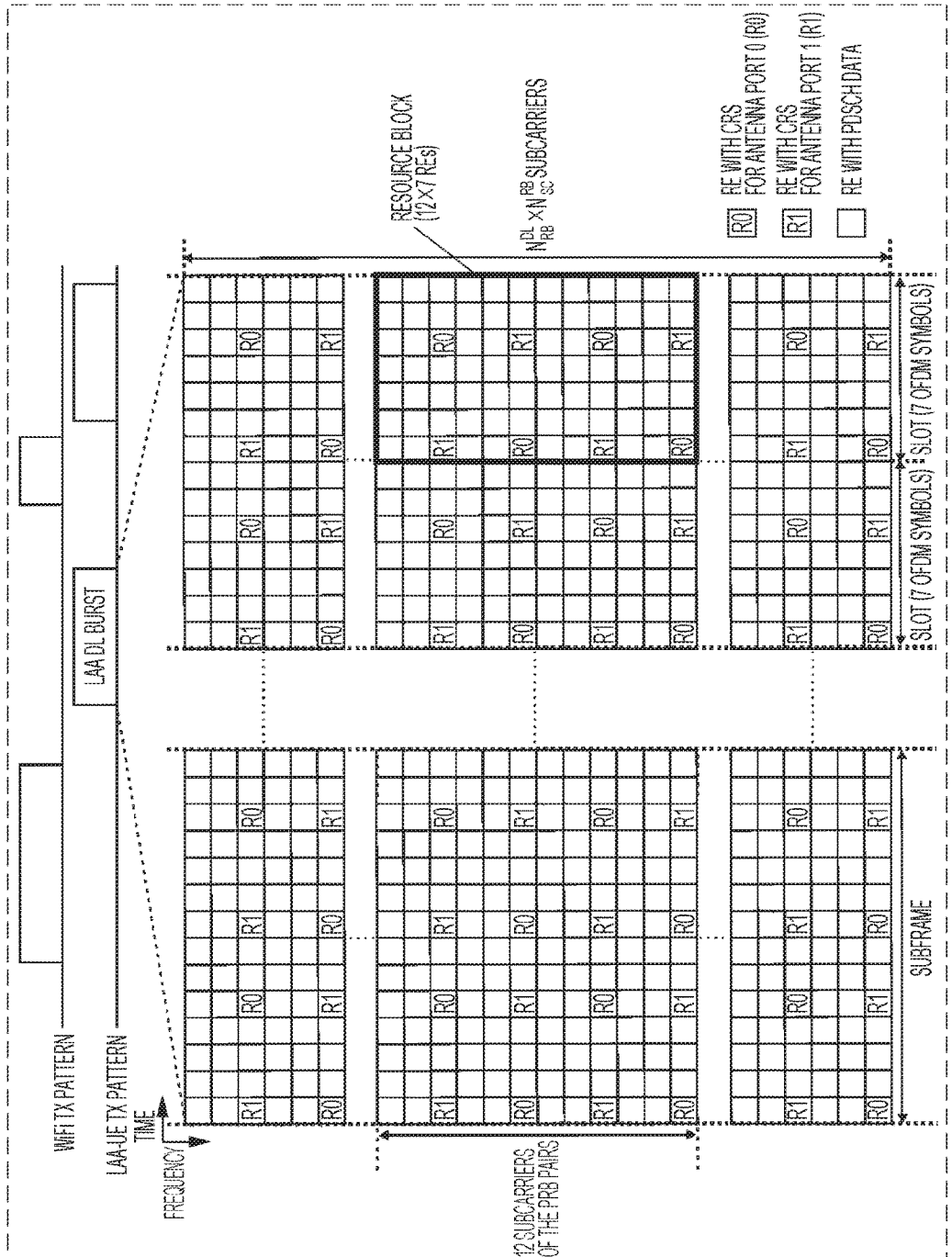
FIG. 12 illustrates the downlink data burst on the unlicensed band in the time-frequency lattice, comprising resource blocks and resource elements.

In the exemplary scenario of FIGS. 10 and 11, it is assumed that the possible interferer WiFi node is located close to UE2, within the coverage area of CRS but outside the coverage area of the (beamformed) PDSCH transmitted to the UE1. FIG. 12 discloses at the top exemplary transmission patterns of the WiFi node and the eNB downlink burst to UE1 over the unlicensed band. As apparent, transmissions by the WiFi node and the eNB in the downlink are not occurring at the same time. FIG. 12 further discloses the LAA downlink burst from the eNodeB in more detail as the time-frequency resources used for transmitting the LAA downlink burst. It is assumed that the LAA downlink burst uses, e.g., the full 20 MHz bandwidth for a plurality of subframes. For simplicity, in the following only the cell-specific reference signals, CRS, are assumed to be transmitted in the PDSCH allocation; the corresponding resource elements carrying the CRS for antenna ports 0 and 1 (R0, R1) are illustrated in FIG. 12. Furthermore, it is assumed that all the remaining resource elements depicted in FIG. 12 (i.e., those resource elements not carrying the CRS) are used for transmitting the PDSCH.

As explained in the background section, the WiFi node needs to perform LBT and CCA before transmitting on the unlicensed band, and thus has to monitor, e.g., the power on the unlicensed band. In the above-described scenario, the WiFi node will experience different power levels in different OFDM symbols since OFDM symbols with only PDSCH exhibit a beamformed radiation pattern which energy does not reach the WiFi node, while OFDM symbols with both CRS and PDSCH exhibit a combination of a beamformed and omni-directional radiation pattern which energy does reach the WiFi node (see FIGS. 10 and 11). The received power level measured at the WiFi node also strongly depends on its location relative to the eNodeB and UE1. As a result, the WiFi node will determine different channel occupancy states (i.e., measured power level above or below CCA threshold) in different OFDM symbols.

Figure 13:
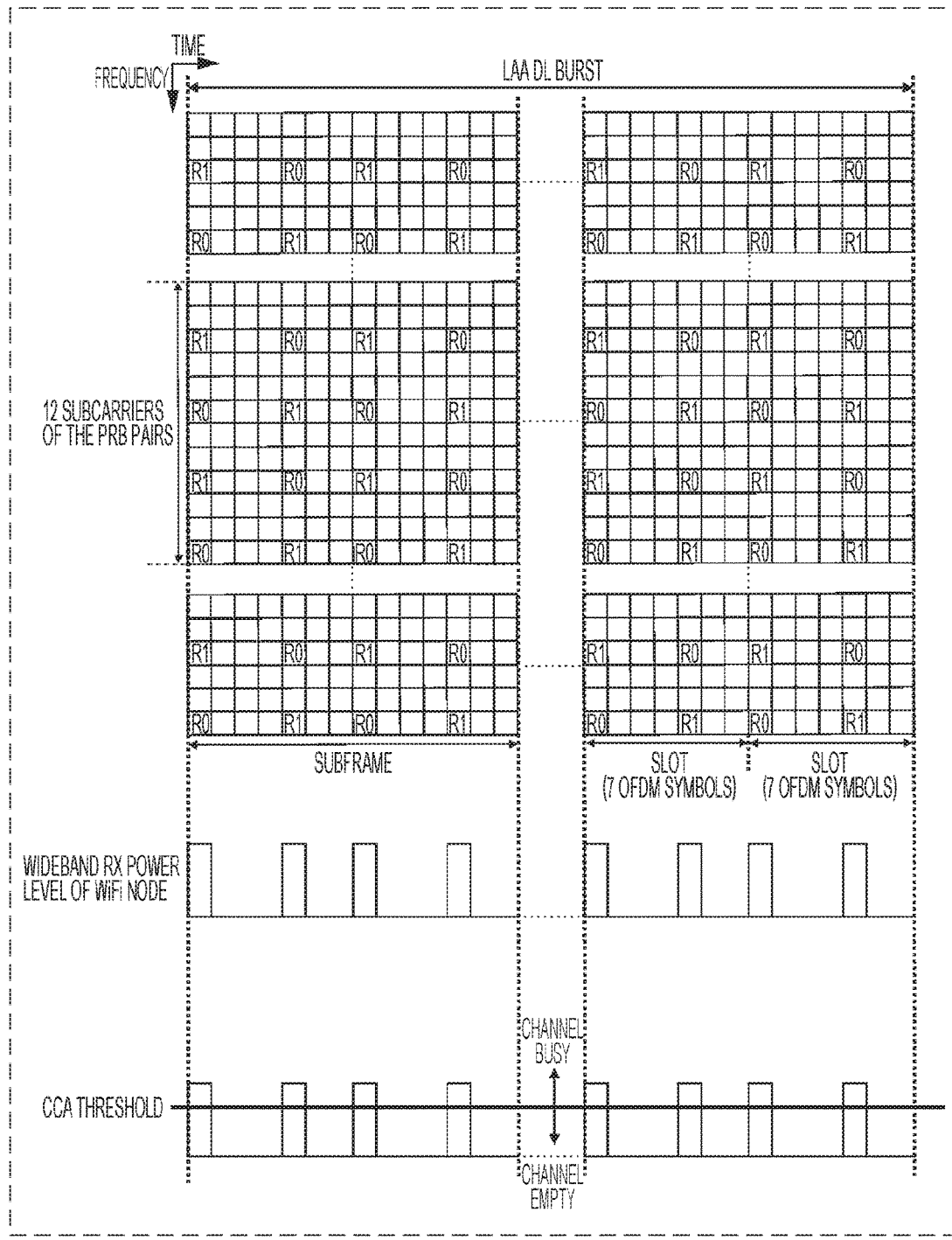
FIG. 13 illustrates the same downlink data burst on the unlicensed band as FIG. 12, and additionally illustrates the reception power measured at a WiFi node and CCA determination in the scenario presented in FIGS. 10 and 11.

This is exemplarily depicted in FIG. 13, which illustrates at the top the LAA Downlink Burst from the eNodeB to UE1, as already explained in connection with FIG. 12, and additionally depicts at the bottom the corresponding power level measured at the WiFi node. The sum power emission pattern that is consisting of the superimposed emission patterns of all subcarriers will determine whether a device at a certain position will detect the channel as free or occupied. As apparent from FIG. 13, at OFDM symbols with CRS the WiFi node will measure an increased power level, in contrast to OFDM symbols without CRS (and only the beamformed PDSCH REs), which will lead to a significantly fluctuating reception power level at the WiFi node. Correspondingly, the determining of the channel occupation based on the power detection during LBT/CCA will be inconsistent during such LAA downlink bursts.

It should be also noted that the minimum CCA duration is only 20 μs according to the European regulations as described in the harmonized European standard ETSI EN 301 893, current version 1.8.0, whereas the duration of an OFDM symbols is ~71 μs. Depending on when the WiFi node tries to access the unlicensed channel, it will either determine that the channel is free or that the channel is busy.

Figure 14:
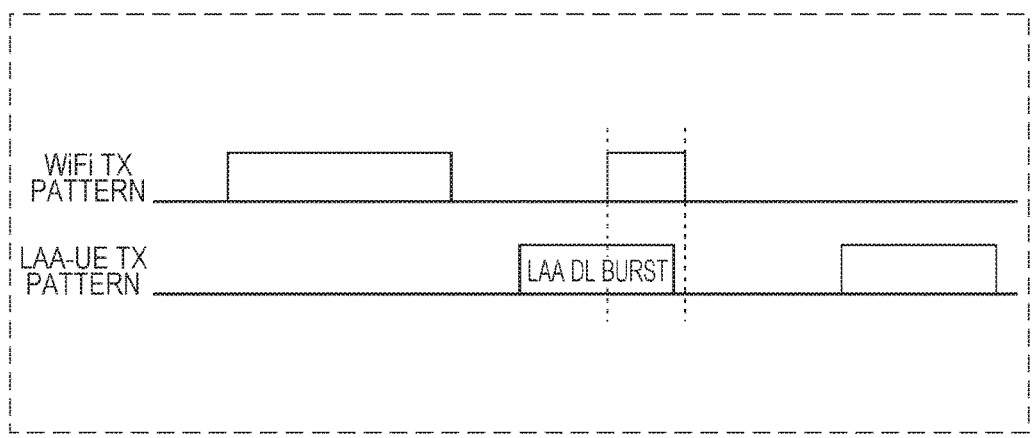
FIG. 14 illustrates schematically overlapping transmission patterns from the WiFi node and the eNodeB.

First of all, such an inconsistent channel occupancy detection is disadvantageous. Furthermore, the WiFi node, when detecting the unlicensed band as empty (during corresponding OFDM symbols carrying only the beamformed PDSCH transmission), may immediately initiate a transmission which may then overlap with the transmission from the eNodeB as exemplarily depicted in FIG. 14, and which may cause interference problems.

Figure 15:
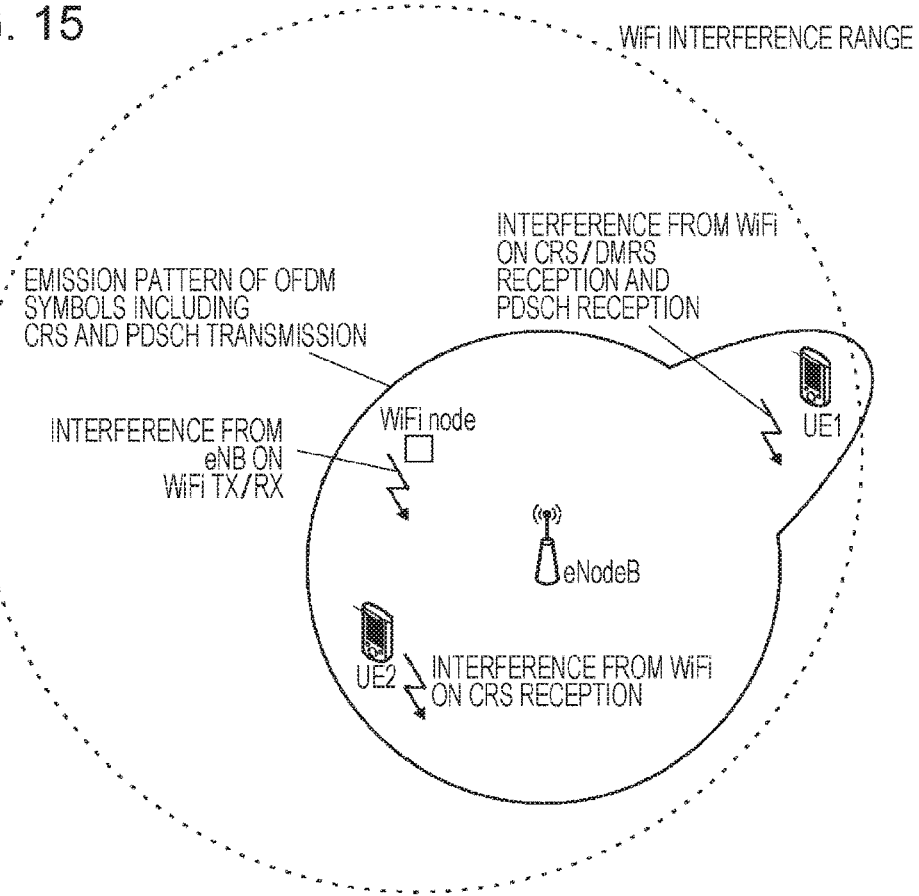
FIG. 15 illustrates the same scenario from FIGS. 10 and 11, and additionally depicts the interference range of the WiFi node and resulting interferences when performing a transmission in the unlicensed band.

In particular, FIG. 15 illustrates exemplarily the interference range of the WiFi node as a dash-lined circle around the WiFi node, in addition to the radiation pattern of an OFDM symbol with both CRS and the beamformed PDSCH (as already presented in FIG. 11). FIG. 15 also illustrates the interferences caused by such overlapping transmissions on the unlicensed band in the different nodes, WiFi node, UE1 and UE2. The WiFi transmission may not only cause interference with the LAA downlink burst to UE1, but also with the CRS reception at the UE1, and particularly the near UE2 may experience a strong interference. Correspondingly, CSI and/or RRM measurements, both of which can be based on the CRS, may become invalid or unusable. In addition, also the transmission of the WiFi node experiences interference due to the CRS and the beamformed transmission.

Although the above problem was described solely in connection with the CRS (cell-specific, common, reference signal), the same problem may occur with other reference signals transmitted during the LAA too, such as the CSI-RS, the PRS, MBSFN-RS, and for DRS. Moreover, the above problem may also occur with the synchronization signals PSS, SSS presented in the background section. These reference and synchronization signals have in common that they are usually transmitted in an omni-directional fashion, in contrast to a beamformed PDSCH transmission, such that certain spatial directions or areas experience different reception power levels. This may lead to a fluctuating (wideband) reception power level at a (WiFi) node which in turn may cause an inconsistent channel state interpretation of the unlicensed band (free/busy) as explained above. The DMRS which usually are precoded in the same manner as the PDSCH would exhibit the same spatial emission pattern as the PDSCH such that the DMRS alone usually do not cause this problem.

The following exemplary embodiments are conceived by the inventors to mitigate the problems explained above.

Some of these are to be implemented in the wide specification as given by the 3GPP standards and explained partly in the background section, with the particular key features being added as explained in the following pertaining to the various embodiments. It should be noted that the embodiments may be advantageously used, for example, in a mobile communication system, such as 3GPP LTE-A (Release 10/11/12/13) communication systems as described in the background section above, but the embodiments are not limited to its use in these particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure and its embodiments as such.

According to a first solution to the above described problem, CRS-based transmission of PDSCH shall not be allowed in unlicensed bands. Instead, DMRS-based PDSCH transmission and reception shall be used when transmitting downlink data in an unlicensed band. Furthermore, the CRS emission pattern could be emulated in certain RBs. This solution comes with a possible drawback that restricting LAA downlink to only DMRS-based transmissions limits the available transmission modes (TMs) to only a few (e.g., TMs 7, 8, 9, and 10).

Another solution to the above described problem is that the spatial power emission pattern of the CRS (at least those transmitted during the LAA burst) is changed for every LAA burst so as to correspond to the beamforming precoding used for the PDSCH of the LAA burst. Put differently, the same precoding used for beamforming the PDSCH could be used for those resource elements carrying the CRS. However, also this solution comes with possible drawbacks, one of which is the limited coverage area of the CRS, since no omni-directional radiation pattern is achieved due to the adapted precoding of the CRS. Furthermore, due to changing radiation pattern of the CRS, CRS measurements (e.g., for CSI or RRM measurements) may not be possible over multiple LAA bursts.

In view of the above-mentioned drawbacks identified by the inventors, a further solution according to the following exemplary embodiment(s) will be presented in detail in the following. These exemplary embodiments will be described so as to highlight the underlying principles and shall thus not be understood as limiting the present disclosure. To facilitate illustration, various assumptions are made, which however should be regarded as not restricting the present disclosure. The same or a similar scenario as in FIGS. 10 and 11 is used for presenting the embodiment, thus assuming a cell controlled by an eNodeB in which a WiFi node and two UEs are located. Furthermore, at least UE1 is supporting Licensed-Assisted Access and can thus communicate via an unlicensed band with the eNodeB (details regarding LAA are omitted here and instead reference is made to the background section). The eNodeB intends to use beamforming in the downlink to reach UE1 and to provide same with corresponding PDSCH data (details regarding beamforming are omitted and instead reference is made to the background section). UE2 is supposed to be idle, i.e., to not be communicating with another node or the eNodeB. The WiFi node, which is located near UE2 but well outside the beam of the PDSCH transmission from the eNodeB to UE1, is trying to access the unlicensed band and correspondingly performs LBT and CCA (details regarding LBT and CCA are omitted here and instead reference is made to the background section).

Figure 5:
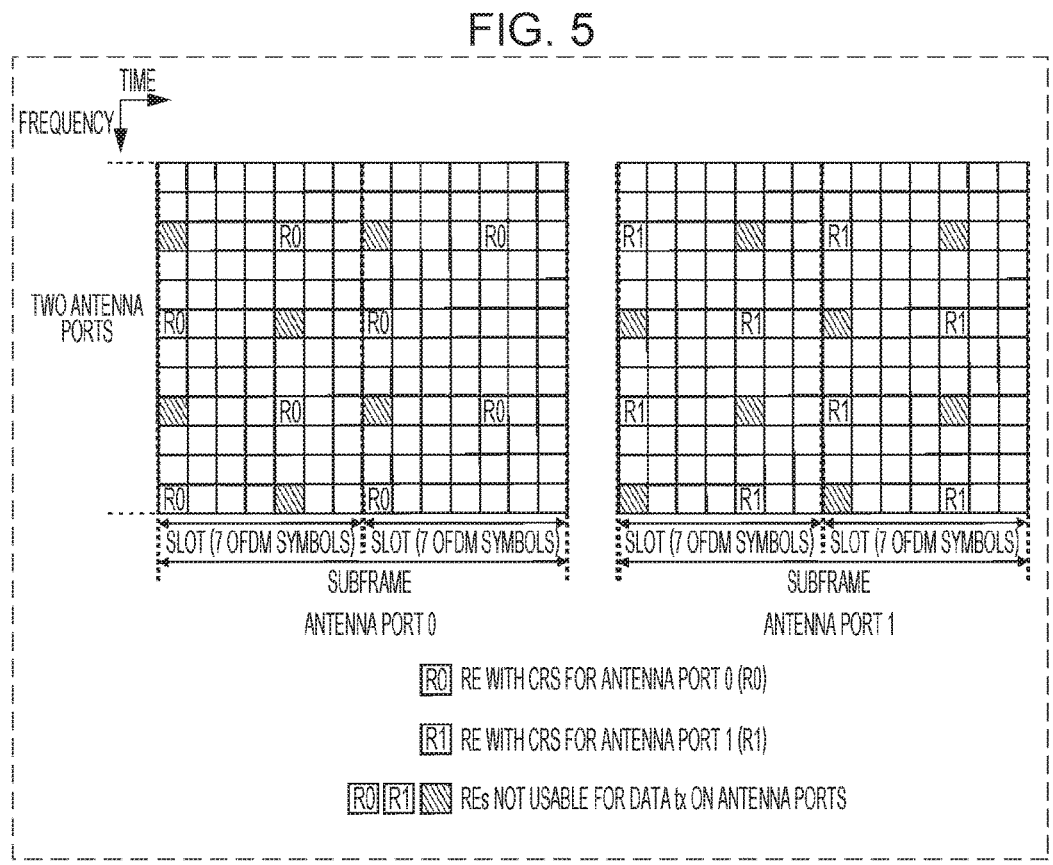
FIG. 5 illustrates the transmission patterns of the cell-specific reference symbols for antenna ports 0 and 1.

For ease of illustration, it is mostly assumed that the eNodeB transmits CRS for two antenna ports 0 and 1 only (i.e., CRS R0, and R1, see also FIG. 5 for the corresponding transmission patterns), i.e., neither CRS for antenna ports 2 and 3, nor other (cell-specific) reference and synchronization signals, such CSI-RS, DRS, PRS, PSS, SSS are transmitted. Correspondingly, in the subframes at which the beamformed PDSCH transmission is to be transmitted, also the CRS of antenna ports 0 and 1 are transmitted at the corresponding resource elements. As will be explained later, the principles underlying the exemplary embodiments are also applicable for scenarios where more or other reference signals are transmitted (see, e.g., FIG. 22 which assumes CRS for antenna ports 0-3).

Moreover, an omni-directional pattern is assumed for the CRS transmission in the cell of the eNodeB: i.e., the resource elements carrying the corresponding CRS of antenna ports 0 and 1 are respectively transmitted from, e.g., one physical antenna element (or more physical antenna elements with a superposition of them being omni-directional). However, the present disclosure is also applicable to CRS transmissions where no omni-directional radiation pattern is achieved, but, e.g., only a sector of ~120° is covered by the reference signal broadcast, as will be explained in more detail later.

The PDSCH allocation is assumed to span the whole frequency range of 20 MHz, and all resource elements of all resource blocks within a subframe are used for the PDSCH transmission; except those resource elements carrying a reference/synchronization signal. The exemplary embodiment, and particularly the underlying principles, are applicable not only to such wideband allocations, but also to smaller allocations, e.g., where only particular resource block (groups) are used by the eNodeB to transmit the downlink data to the UE via the unlicensed band.

Figure 8:
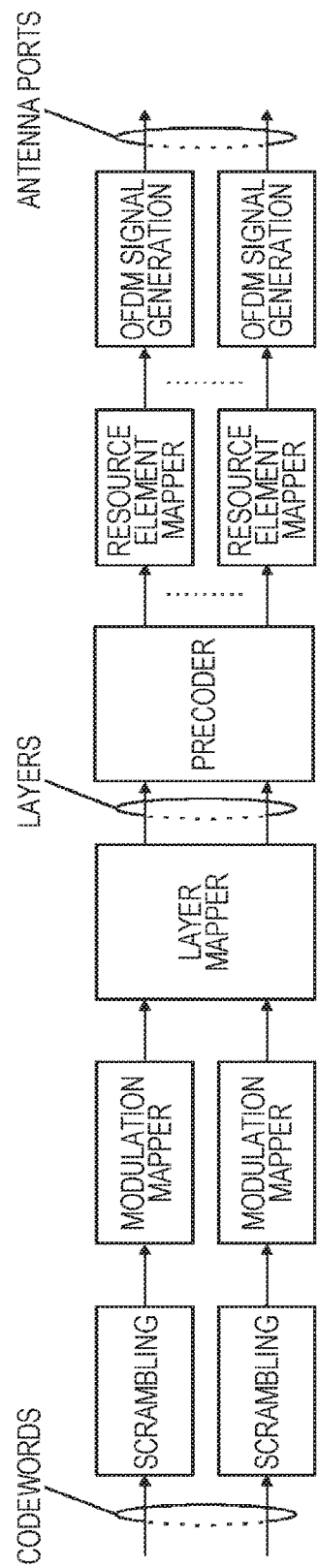
FIG. 8 illustrates the general physical channel processing for downlink physical channels.
Figure 9:
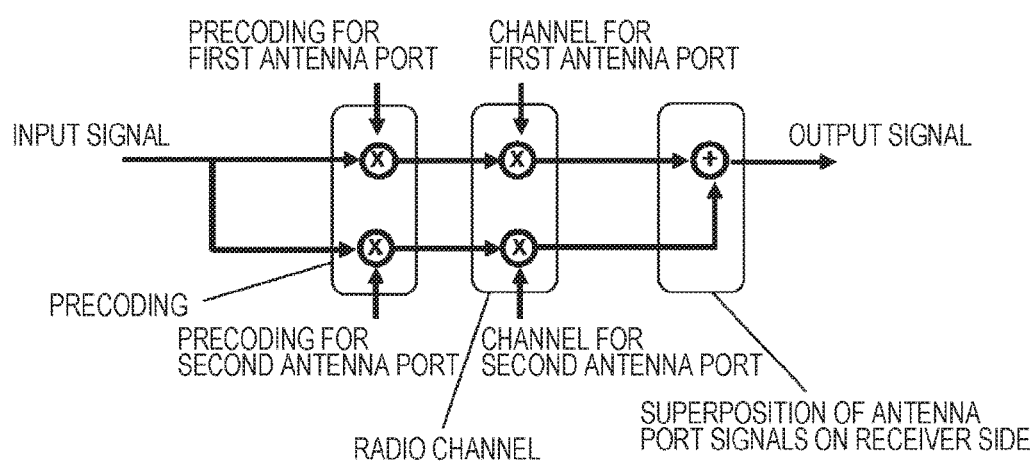
FIG. 9 illustrates an exemplary signal transmission chain with precoding for two transmit antenna elements and one receiver antenna element.

A processing chain as depicted in FIGS. 8 and 9 of the background section can be exemplarily assumed for the following exemplary embodiment as well, however with some changes to the precoding as will become apparent from below; e.g., the precoding can be changed within one subframe per resource element such that different resource elements carrying the PDSCH data within a subframe can be precoded differently.

CRS-based PDSCH transmissions are mainly assumed in the following, where the UE is explicitly informed about the precoding to be used for the PDSCH transmission via a PMI in the corresponding DCI of the PDCCH relating to the PDSCH. Alternatively, the exemplary embodiments are equally applicable to DMRS-based PDSCH transmissions, where, instead of being directly informed about the PDSCH precoding, the UE derives the precoding applied to the PDSCH from the DMRS also transmitted in the PDSCH allocation (i.e., resource blocks used for the PDSCH) (further details are omitted and instead reference is made to the background section).

According to the exemplary embodiments, the eNodeB performs an improved beamforming for PDSCH transmissions over the unlicensed bands, in this particular scenario for the PDSCH transmission to UE1. In the usual manner the eNodeB determines an appropriate precoding matrix to direct the transmission power of the PDSCH towards UE1 (e.g., based on a corresponding PMI indication from UE1 or based on uplink measurements; details on how to determine the (best) precoding matrix to reach UE1 are omitted here, and instead reference is made to the background section). A corresponding DCI format (PDCCH) is transmitted from the eNodeB to UE1 for the PDSCH transmission, the PDCCH among other things indicating the resource allocation (e.g., resource blocks which will be used, here the whole 20 MHz frequency range) and the precoding used for the PDSCH transmission to achieve the beamforming. As currently-standardized, the PDCCH would not be transmitted via the unlicensed band but via the PCell; although this may change in future releases, such that the POOCH may be transmitted via an SCell or even via the unlicensed band also used for the PDSCH transmission.

According to the exemplary embodiments, this "normal" precoding for achieving a beam directed towards UE1 is not applied by the eNodeB to all resource elements used within a subframe to transmit the PDSCH, but only to part of them. Rather, those other resource elements for transmitting the PDSCH in the subframe to which the "normal" precoding is not applied, will be processed differently such that no beamforming according to the first precoding is achieved. For example, these remaining elements may be subject to at least one different precoding such that a radiation pattern different from the beam directionality of the "normal" precoding is achieved. Therefore, within each subframe of the PDSCH transmission at least two different precodings will be used for the resource elements carrying the PDSCH data, such that the transmission energy for the PDSCH is not completely directed by the eNodeB in the narrow beam towards UE1, but also in at least a further different direction.

Furthermore, the resource elements used for carrying the PDSCH transmission within a subframe shall be partitioned such that at least one resource element to which the different precoding is applied is transmitted during at least one OFDM symbol duration where no CRS is transmitted. Put differently, the resource elements within a subframe to which the different precoding is applied shall not all be located in OFDM symbol durations during which already the CRS are transmitted. Many different implementations are possible in this respect, as will be explained later.

At least UE1 must know that only part of the resource elements are precoded in the normal manner, and must know how exactly all the resource elements carrying the PDSCH are precoded so as to be able to properly receive and decode the PDSCH. Thus, the PDSCH data transmission is transmitted from the eNodeB to UE1.

In order to explain the resulting technical effect, it is assumed that this other emission direction achieved by the different precoding of the remaining resource elements of the PDSCH transmission in the subframe covers an area where at least one (WiFi) node is located that is trying to access the unlicensed band, e.g., the area where the WiFi node of FIG. 15 is located. Again, many different implementations are possible in this respect, as will be explained later.

Consequently, part of the transmission power is directed to at least one other direction than the beam direction to UE1 at least another OFDM symbol duration than OFDM symbol durations carrying a CRS. As a result, the WiFi node that is located in the area being covered by the different direction will measure some reception power due to those OFDM symbols during which the different precoding is applied to the PDSCH resource element(s) and may thus be prevented from accessing the unlicensed band during those OFDM symbol durations. Correspondingl, the WiFi node will not create any interference at UE1 and UE2, such that UE1 may continue to receive the downlink data from the eNodeB without interference, and both UE1 and UE2 may perform corresponding channel and RRM measurements correctly based on the CRS.

In order that the WiFi node is prevented from accessing the unlicensed band not just during a single or a few OFDM symbol durations but at any time during the PDSCH downlink burst from the eNodeB to UE1, these remaining resource elements within a subframe carrying the PDSCH to which the different precoding is applied shall be located at all those OFDM symbol durations at which no CRS is carried.

In order that not only the WiFi node is prevented from accessing the unlicensed band but also any (WiFi) node in the cell, the different precoding applied to the remaining resource elements may be defined to achieve an omni-directional radiation pattern; or (at least) the same radiation pattern as the CRS such that CRS REs and PDSCH REs exhibit the same spatial emission pattern thus achieving that the PDSCH transmission exhibits a consistent power emission pattern between OFDM symbols with CRS and OFDM symbols with only PDSCH.

Figure 16:
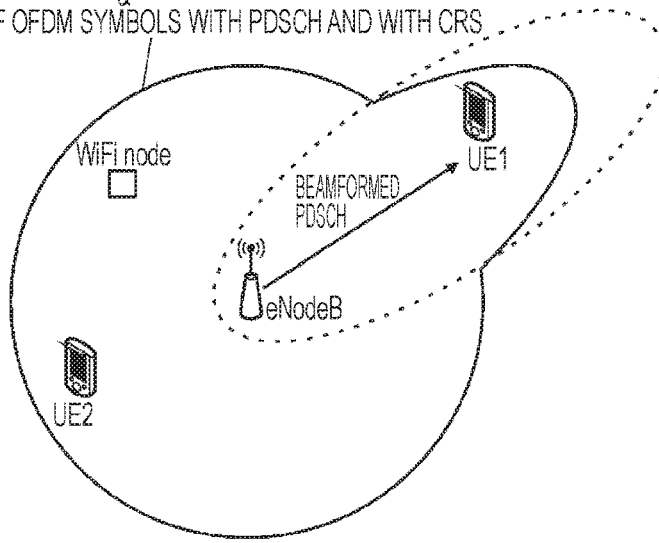
FIG. 16 illustrates a similar scenario as the one from FIGS. 10, 11, and 15, and depicts the power radiation pattern of OFDM symbols carrying only PDSCH data, including adaptively-precoded PDSCH resource elements.

FIG. 16 illustrates the discussed scenario with the eNodeB, UE1, UE2 and the WiFi node. For the illustration of FIG. 16 it is assumed that the different precoding applied to the remaining resource elements of the PDSCH in the subframe is omni-directional (the same as the CRS precoding) and additionally that the amount of transmission power spent on these remaining resource elements is (substantially) the same as spent for transmission of the CRS. Correspondingly, FIG. 16 depicts that the emission patterns of OFDM symbols with the differently-precoded PDSCH REs but with no CRS and of OFDM symbols with the normally-coded PDSCH REs and with CRS are basically the same. Put differently, the CRS power emission pattern is emulated for (part of) the PDSCH transmission, by precoding a suitable amount of resource elements carrying the PDSCH in each subframe in the same manner as the precoding of the CRS. The WiFi node is assumed to be in the power emission range of the eNodeB PDSCH transmission and thus detects the unlicensed band to be occupied also during those OFDM symbols which comprise REs carrying the differently-precoded PDSCH (and possibly comprising normally-precoded PDSCH REs) but no CRS REs.

After having explained the underlying concept and the corresponding effects, in the following various different implementations of the exemplary embodiments will be described in detail. At first, there are several different possibilities as to which resource elements carrying the PDSCH shall be normally precoded for beamforming and which of them should be precoded differently to achieve a different directionality.

FIGS. 17 to 22 show different exemplary resource element mapping patterns according to a first set of implementation, illustrating the whole frequency range of only one subframe of the downlink transmission from the eNodeB to UE1.

The two-dimensional frequency-time lattice in FIGS. 17 to 22 (and also in most of the remaining figures) respectively illustrates the corresponding resource elements carrying the CRS for antenna ports 0 and 1, which were assumed to be transmitted also during the downlink burst on the unlicensed band. As mentioned before, it is assumed that all resource elements within a subframe are used for the downlink transmission from the eNodeB to UE1, except for those resource elements carrying the reference signals (in this case the CRS R0 and R1). For these exemplary illustrations of FIGS. 17 to 22 it is further assumed that at any time in a subframe there is at least one resource element carrying either a CRS or a PDSCH with the different precoding, such that a reception power, e.g., at the WiFi node, will at no time drop to zero (see also FIGS. 23 and 24).

In FIGS. 17 to 22 an empty square shall correspond to a resource element to which the normal precoding is applied to achieve the beamforming to UE1. On the other hand, the hatched squares shall correspond to resource elements to which the different precoding is applied so as to achieve the additional different directionality (e.g., omni-directionality).

FIGS. 17 to 22 are based on some common concepts. In particular, the same resource element mapping pattern may be applicable to each resource block including resource elements carrying the PDSCH data within a subframe; put differently, (at least within one subframe) the resource element mapping pattern does not change from one resource block to another resource block having resource elements carrying the PDSCH data. Furthermore, within each resource block certain subcarriers are made subject to the normal precoding, i.e., resource element(s) from certain subcarriers which carry the PDSCH data are precoded differently than resource elements, carrying the PDSCH data, from the other subcarriers. Finally, only resource elements being located in OFDM symbol durations where no CRS is located shall be precoded differently; i.e., resource elements that are located in OFDM symbol duration where CRS is located shall be precoded in the normal manner so as to achieve beamforming.

Figure 17:
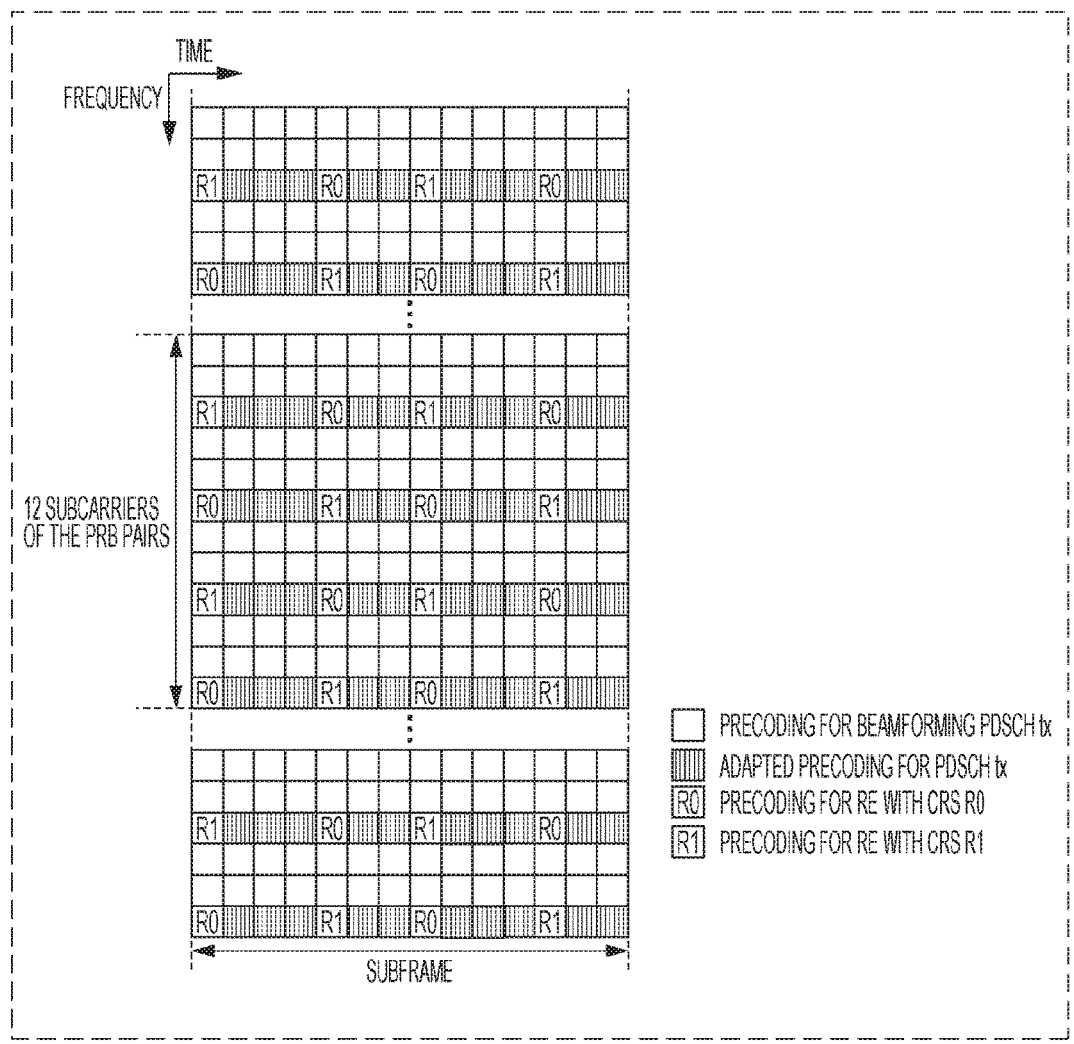
FIG. 17 illustrates a resource element mapping example according to exemplary embodiments.
Figure 18:
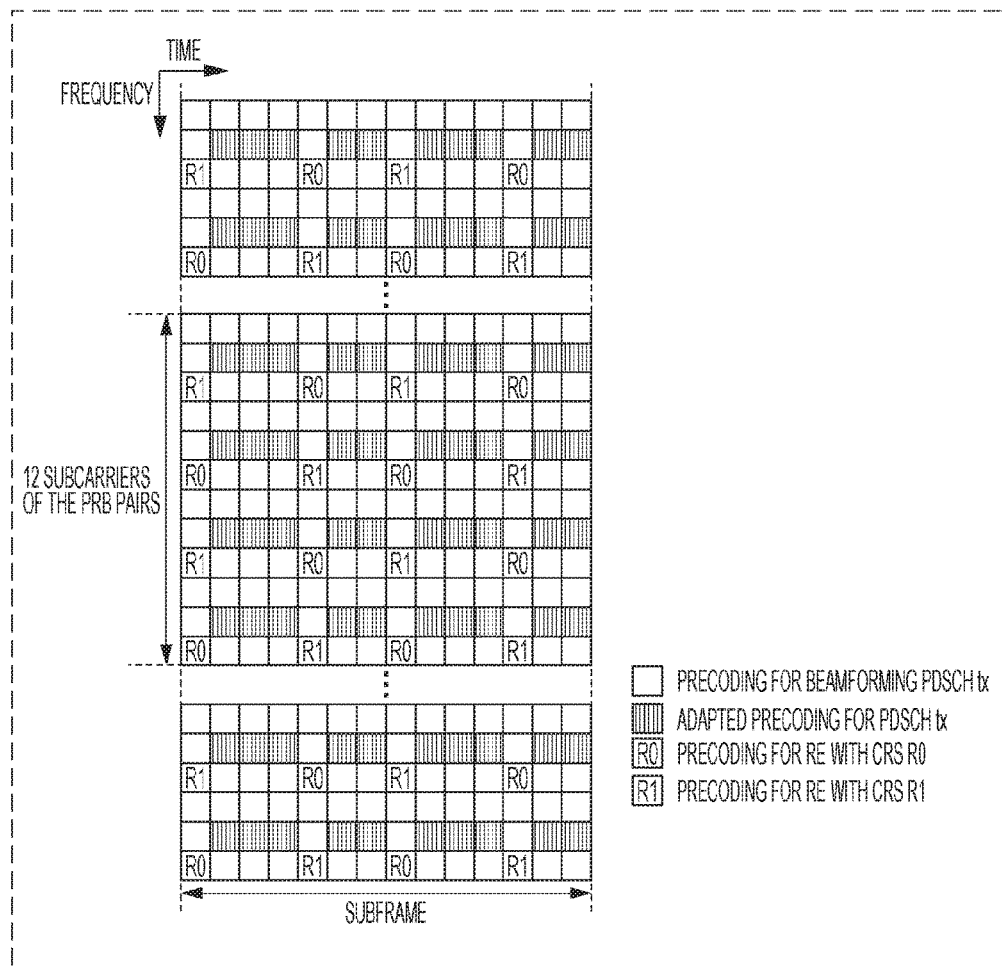
FIG. 18 illustrates a resource element mapping example according to exemplary embodiments.

Following these concepts, FIG. 17 illustrates an exemplary implementation where for each resource block the remaining resource elements in all those subcarriers that already carry the CRS will be precoded differently to transmit the PDSCH data. Consequently, the subcarriers which comprise resource elements carrying the reference signals will be excluded from being processed according to the normal (beamforming) precoding. FIG. 18 illustrates another exemplary implementation where for each resource block particular resource elements in other subcarriers than the ones carrying the CRS will be precoded differently, namely those resource elements carrying the PDSCH data at times where no CRS is transmitted. Furthermore, the exemplary implementation of FIG. 18 foresees—as is also the case in the implementations according to FIGS. 17 and 19—that at any particular time in the subframe there are as many resource elements carrying the PDSCH to which the different precoding is applied as resource elements carrying a CRS (respectively four REs in each resource block).

Figure 19:
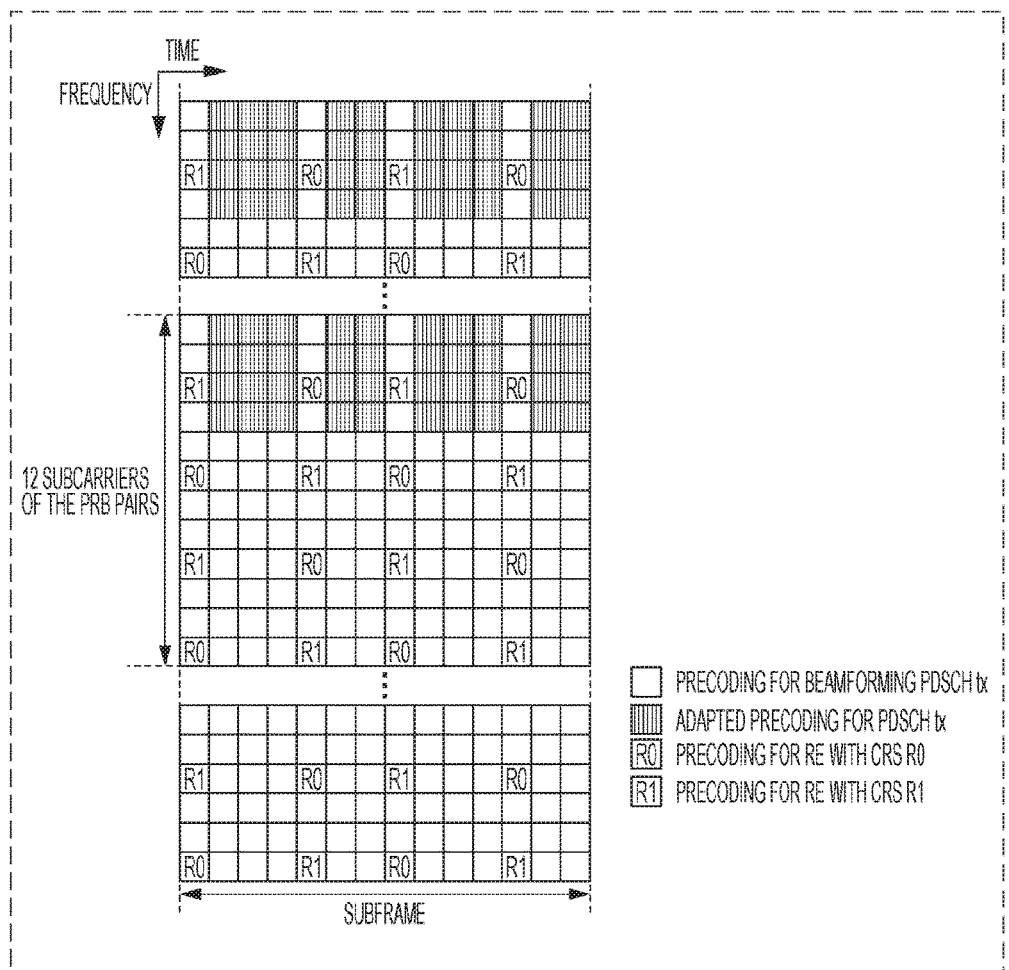
FIG. 19 illustrates a resource element mapping example according to exemplary embodiments.
Figure 20:
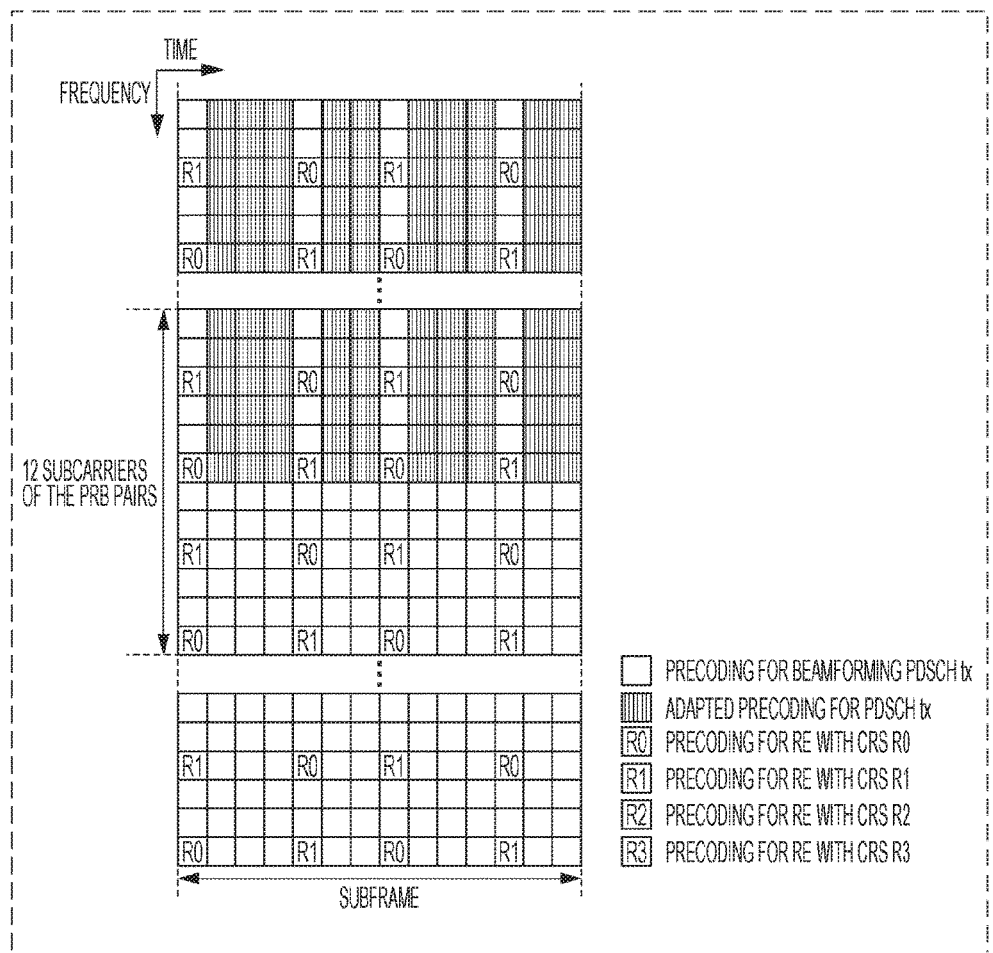
FIG. 20 illustrates a resource element mapping example according to exemplary embodiments.
Figure 21:
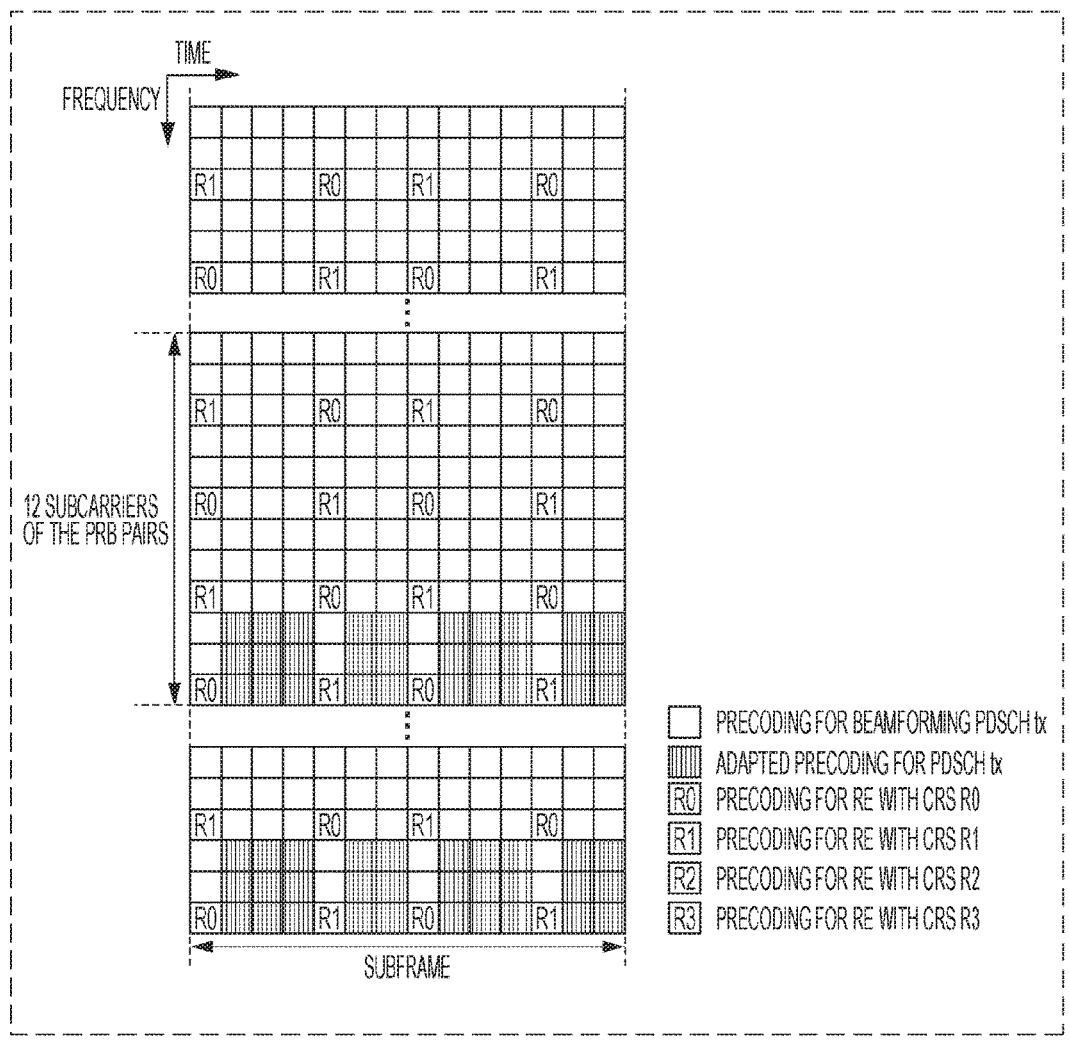
FIG. 21 illustrates a resource element mapping example according to exemplary embodiments.

In contrast to FIGS. 17 and 18 where the subcarriers that include those PDSCH resource elements to which the different precoding is applied are dispersed over the resource block in the frequency domain, for the implementations according to FIGS. 19, 20, and 21 these subcarriers are adjacent and not dispersed; in FIGS. 19 and 20 at the upper part of each resource block, and in FIG. 21 at the lower part of each resource block. FIGS. 19, 20, and 21 differ from each other in the number of PDSCH resource elements to which the different precoding is applied. In FIG. 19 there are four resource elements per resource block and per OFDM symbol duration; the same number as resource elements carrying the CRS, as already mentioned before. In FIG. 20 there are six resource elements per resource block and per OFDM symbol duration, and thus more than resource elements carrying CRS. In FIG. 21 there are three resource elements per resource block and per OFDM symbol duration, and thus less than resource elements carrying CRS, FIGS. 17 to 20 are only examples as to which PDSCH resource elements can be chosen to not be precoded according to the normal beamforming precoding, but with the different precoding. Of course, other resource elements may be selected too.

As was mentioned before, for the previous implementations it was assumed that only the CRS for antenna ports 0 and 1 is transmitted by the eNodeB, so as to facilitate illustration of the principles.

Figure 6:
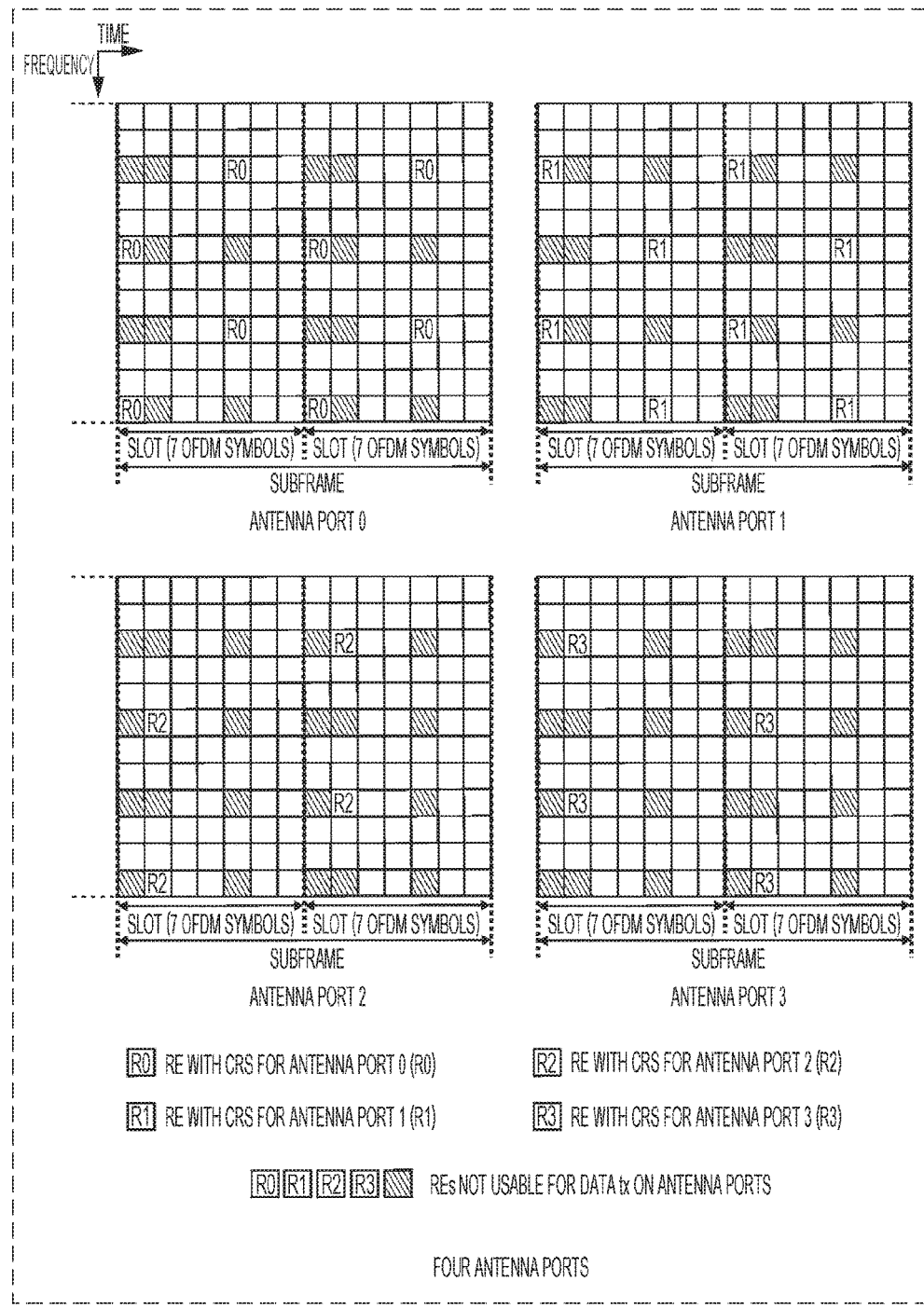
FIG. 6 illustrates the transmission patterns of the cell-specific reference symbols for antenna ports 0, 1, 2, and 3.
Figure 7:
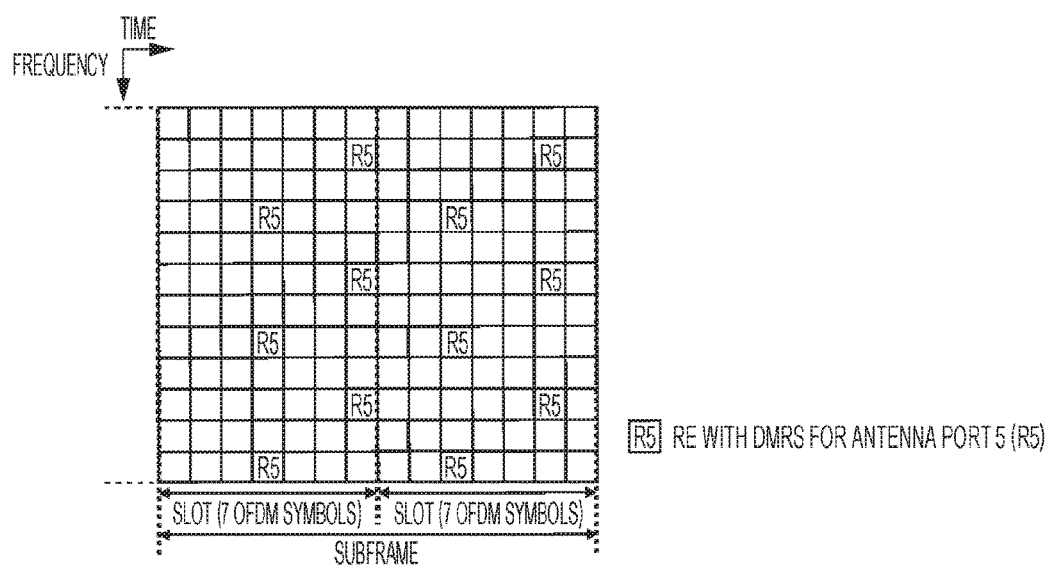
FIG. 7 illustrates the transmission pattern of the UE-specific reference symbol (DMRS) for antenna port 5.
Figure 22:
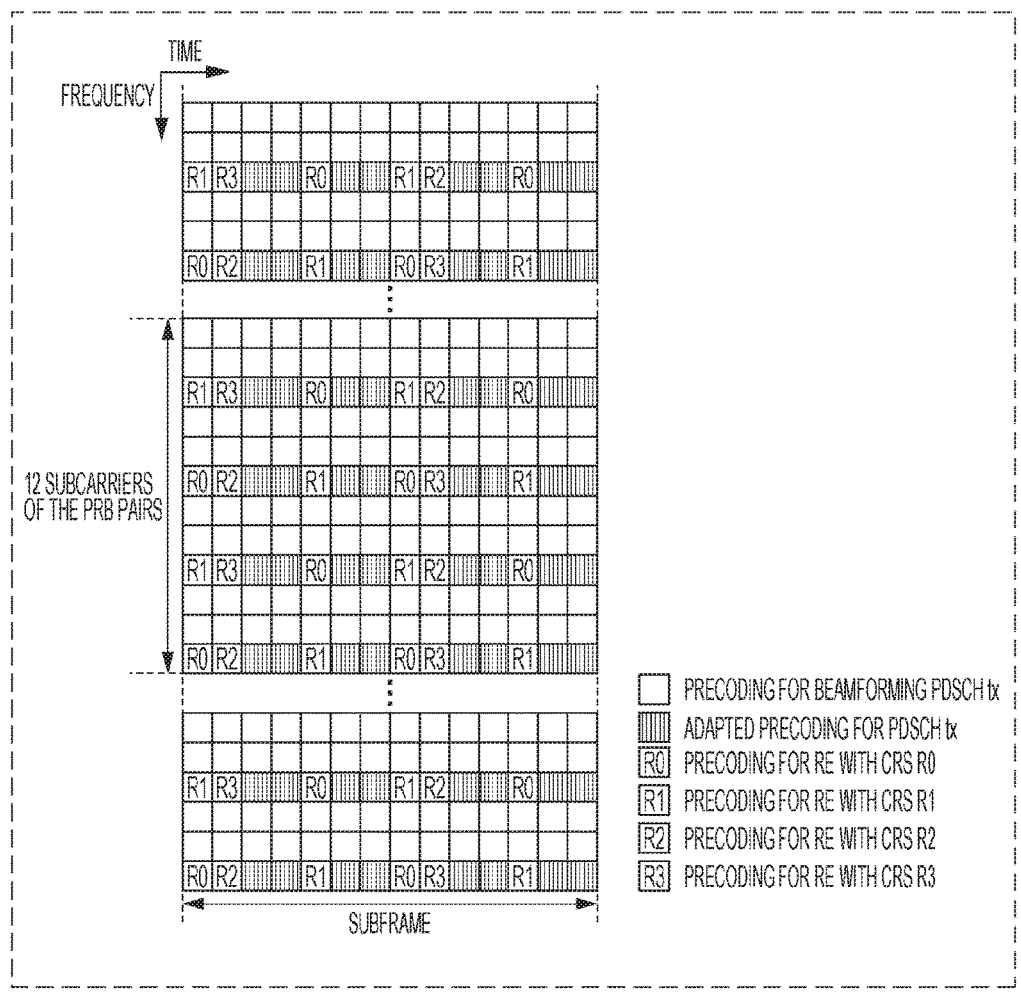
FIG. 22 illustrates a resource element mapping example according to exemplary embodiments.
Figure 23:
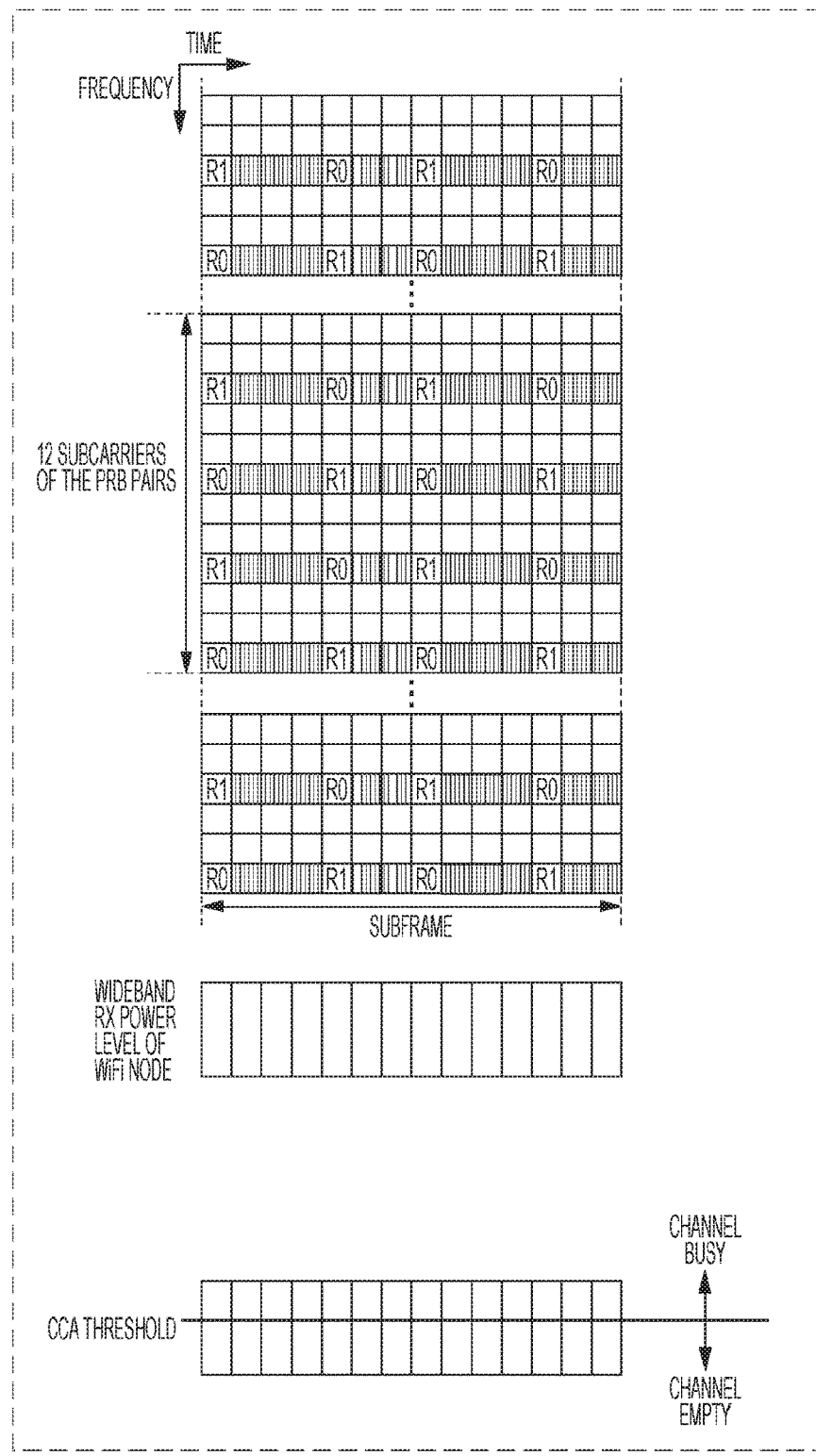
FIG. 23 illustrates the resource element mapping examples of FIG. 17, additionally showing the reception power level and CCA determination at the WiFi node.
Figure 24:
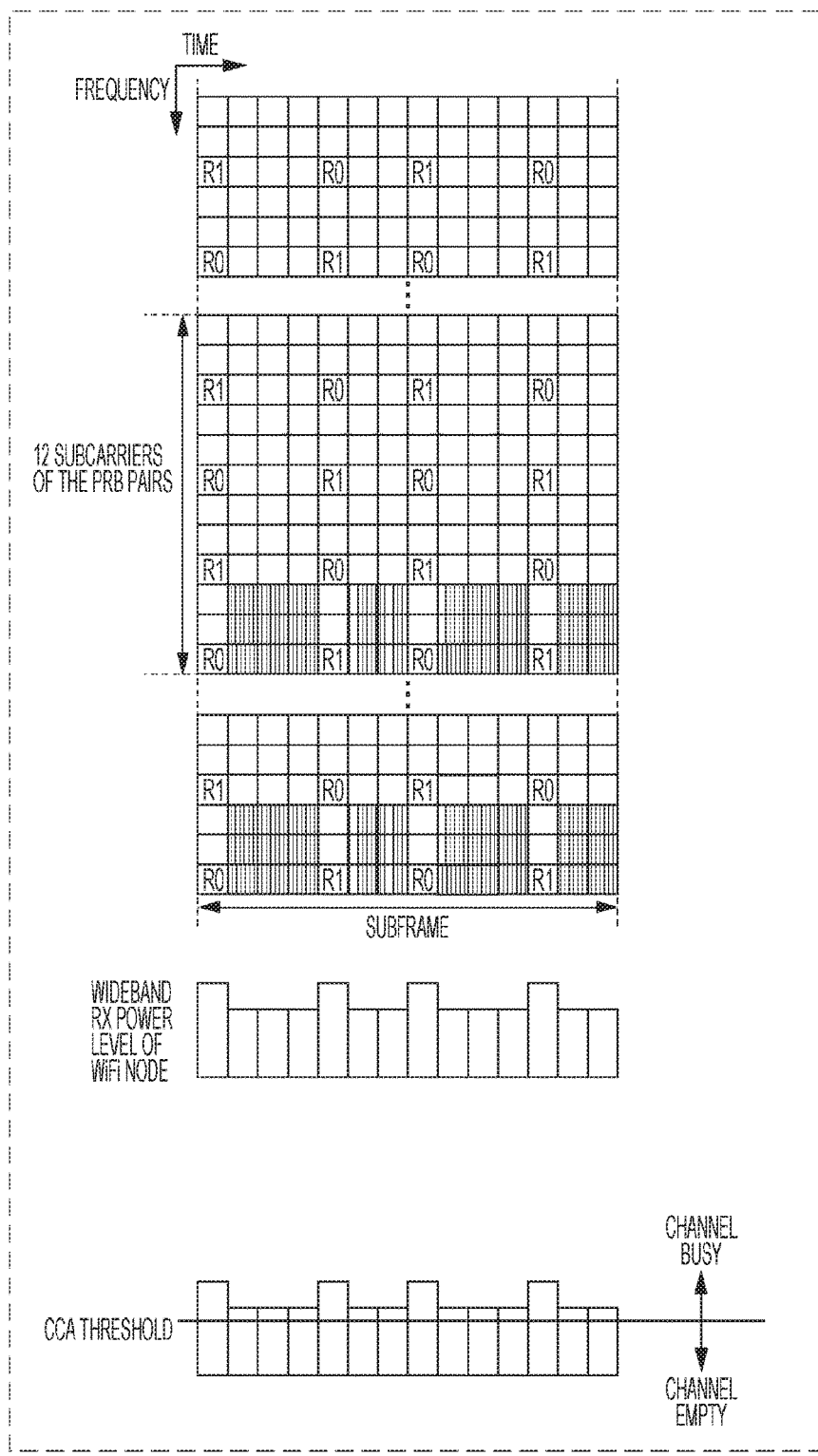
FIG. 24 illustrates the resource element mapping examples of FIG. 21, additionally showing the reception power level and CCA determination at the WiFi node.

In FIG. 22 it is assumed that CRS for all four antenna ports 0-3 are transmitted, assuming the same transmission pattern as presented in the background section (see FIG. 6). To facilitate comparison, the same implementation as in FIG. 17 is assumed, where for each resource block the remaining resource elements in all those subcarriers that already carry the CRS will be precoded differently to transmit the PDSCH data. In the particular scenario of FIG. 22 this means that for each such subcarrier two less resource elements are usable for carrying PDSCH transmission, and thus two less resource elements are precoded differently. Although this implementation only assumes the additional transmission of CRS of antenna ports 2 and 3, compared to the implementation of FIG. 17, the same concept is applicable when considering transmission of further reference and/or synchronization signals. Also, although only the concept of FIG. 17 was described in connection with the additional transmission of CRS antenna ports 2 and 3, also the other presented implementations as exemplified in FIGS. 18 to 21 are applicable, FIGS. 23 and 24 are respectively based on the resource mapping implementations of FIGS. 17 and 21, and respectively illustrate at the bottom the resulting reception power measurement at the WiFi node and the corresponding CCA determination. As apparent from FIG. 23 basically the same reception power is received by the eNodeB at any OFDM symbol duration, Since the resource mapping implementation assumed for FIG. 24 precodes per resource block less PDSCH resource elements with the omni-directional precoding than there are CRS resource elements, less reception power will be measured at these times, as illustrated at the bottom of FIG. 24. Nonetheless, in view of that the CCA threshold is still lower than this lower reception level, the WiFi node will equally determine the unlicensed band to be occupied.

FIG. 23 illustrates the stable power emission pattern between different OFDM symbol durations of the PDSCH transmission over the unlicensed band, which thus results in a consistent channel occupation status for potential interferer stations such as the WiFi node.

Figure 25:
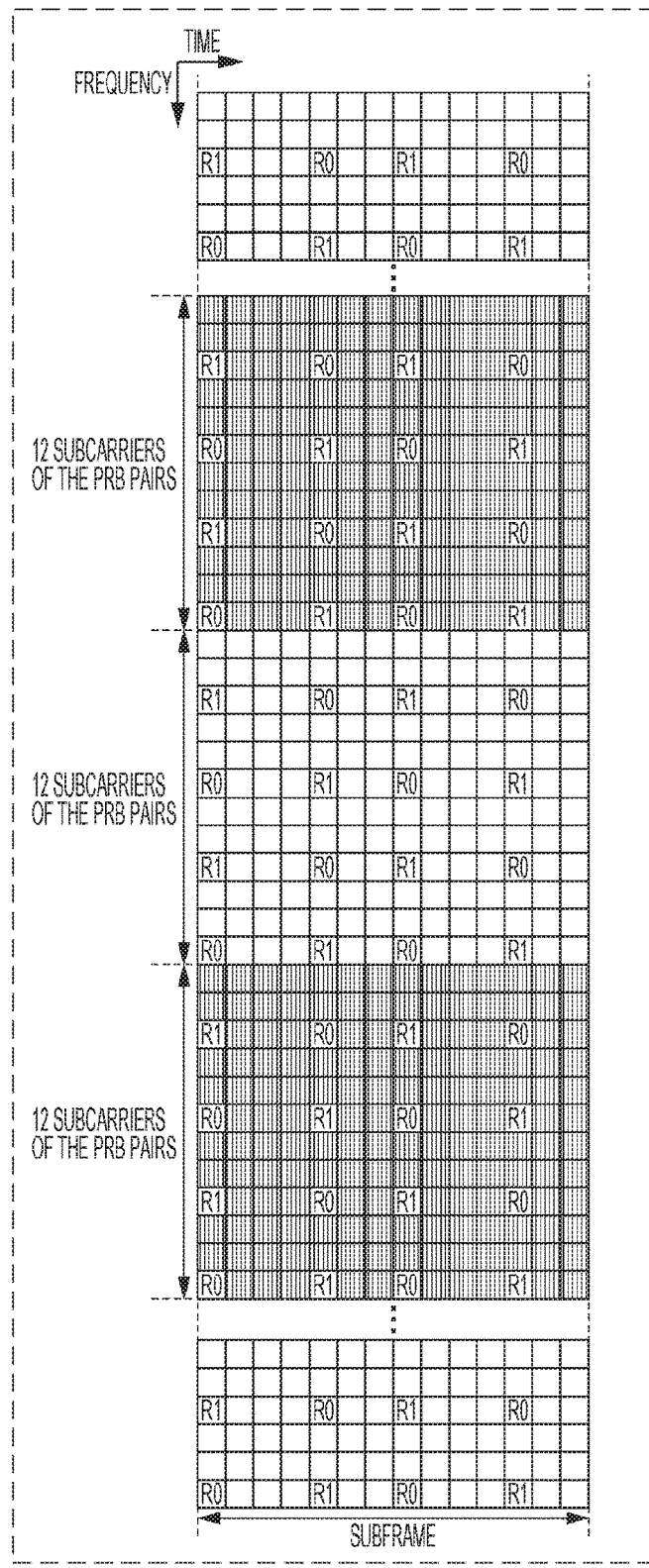
FIG. 25 illustrates further resource element mapping examples according to further exemplary embodiments.

FIG. 25 illustrates a still different resource element mapping example, which differs from the one exemplarily illustrated in FIGS. 17 to 24. The concept behind the resource element mapping example of FIG. 25 is that within each subframe of the LAA downlink transmission certain resource blocks are excluded from being made subject to the normal precoding (i.e., the precoding achieving the beamforming for reaching UE1). Put differently, a particular precoding is applied per resource block such that all the resource elements used to transmit the PDSCH data within one resource block are precoded in the same manner, be it according to the normal (beamforming) precoding or be it according to the different (omni-directional) precoding.

Consequently, in contrast to the previous concept discussed in connection with FIGS. 17 to 24, every resource block is not precoded in the same two-fold manner, and furthermore also resource elements being located in OFDM symbol durations where CRS are located shall be precoded differently.

Figure 26:
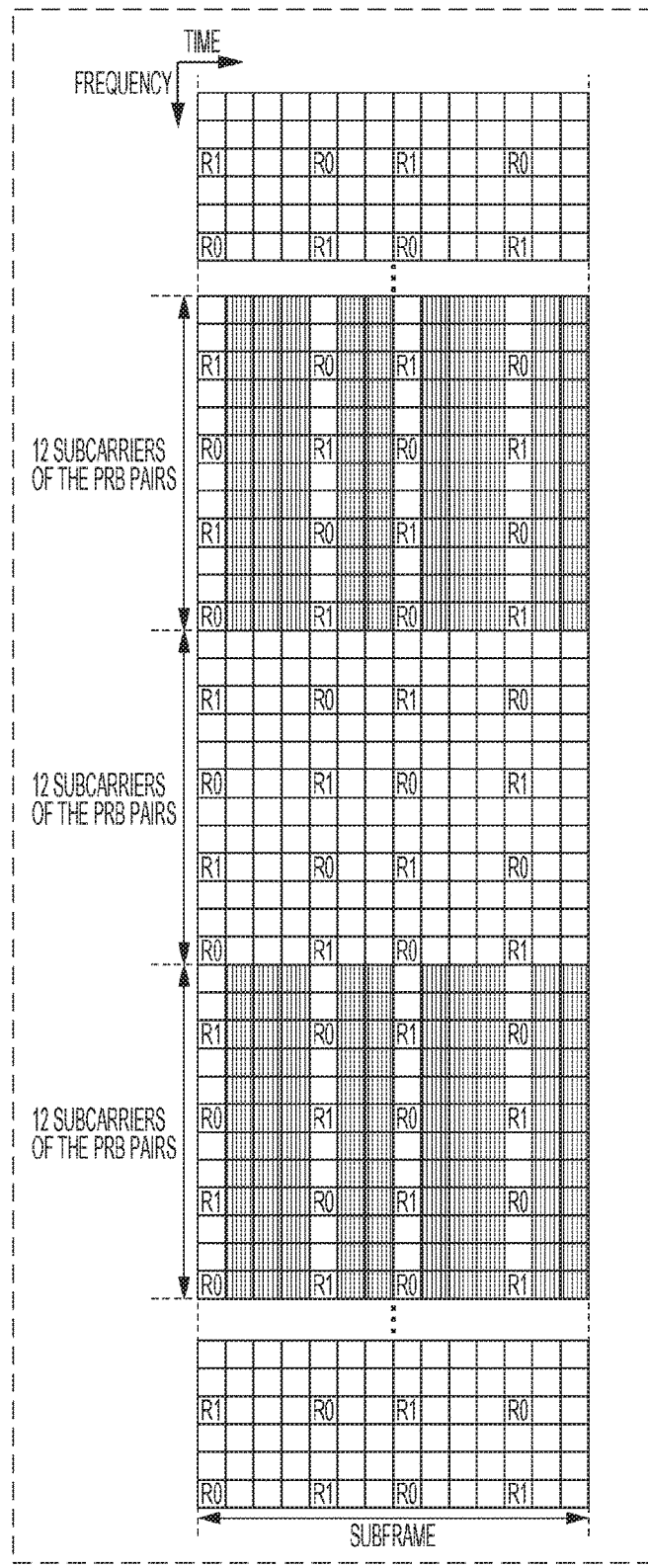
FIG. 26 illustrates further resource element mapping examples according to further exemplary embodiments.
Figure 27:
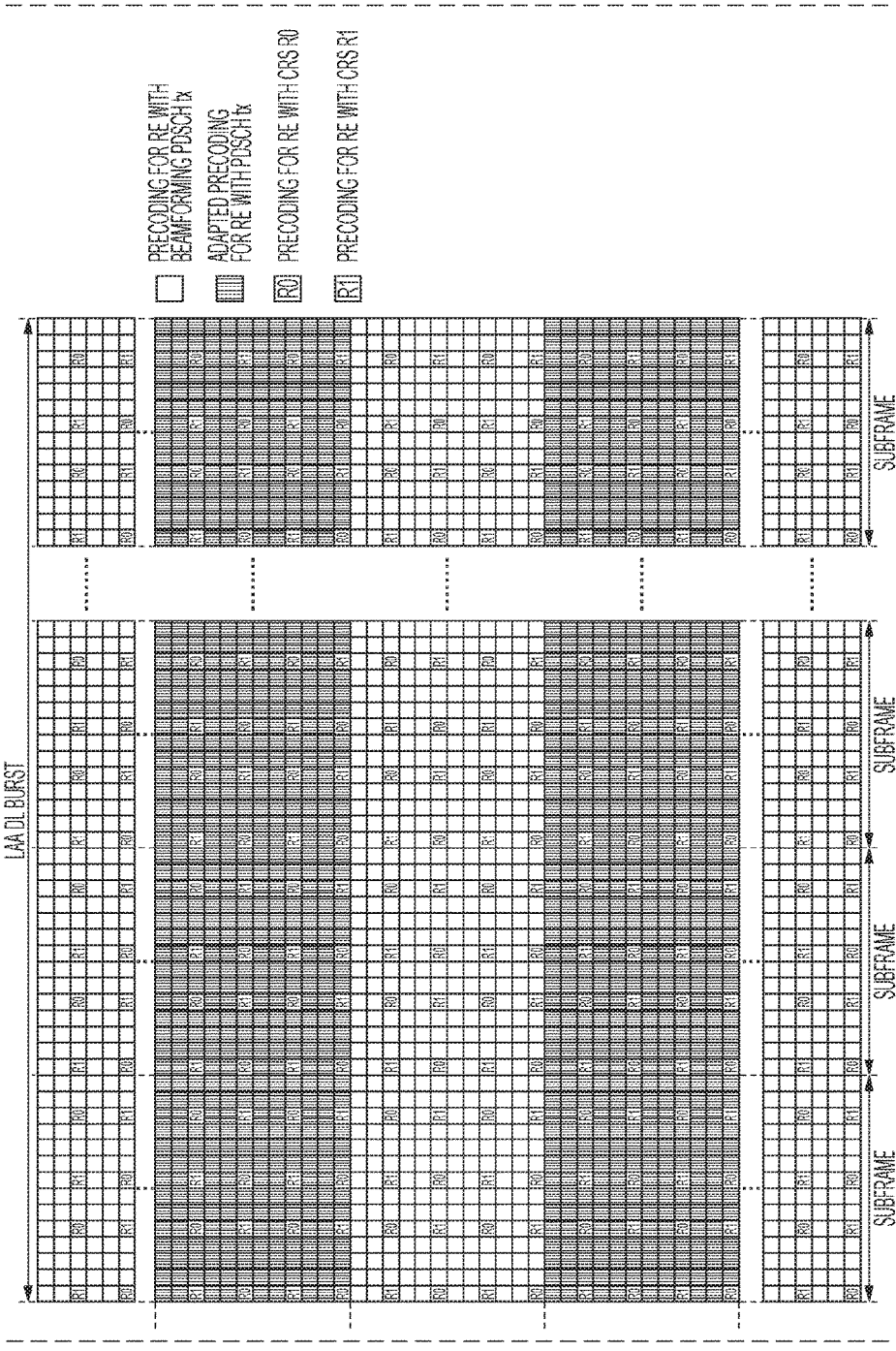
FIG. 27 illustrates resource element mapping over several subframes of an LAA downlink transmission.

FIG. 26 illustrates a further resource element mapping example, according to which within each subframe of the LAA downlink transmission certain resource blocks containing resource elements carrying the PDSCH data are processed according to normal precoding so as to achieve the beamforming, whereas in the remaining resource blocks containing resource elements carrying the PDSCH data only resource elements being located in OFDM symbol durations where no CRS are located shall be precoded differently. In other words, resource elements that are located in OFDM symbol durations where the CRS is located shall be precoded in the normal manner so as to achieve the beamforming, In the above, three different concepts have been described in connection with FIGS. 17 to 26 as to which resource elements within a subframe are to be precoded in which manner. These concepts may be repeated for each subframe of the LAA data transmission. This is exemplarily illustrated in FIG. 27 for the resource element mapping implementation of FIG. 25, where exactly the same resource blocks within each subframe are precoded in the same manner, be it according to the normal precoding so as to achieve the beamforming or according to the different precoding so as to achieve the other directionality. This has the advantage that the UE may be easily informed once about how to precode the various resource elements of the resource blocks within one subframe carrying the PDSCH transmission, and the UE applies this to every subframe.

Figure 28:
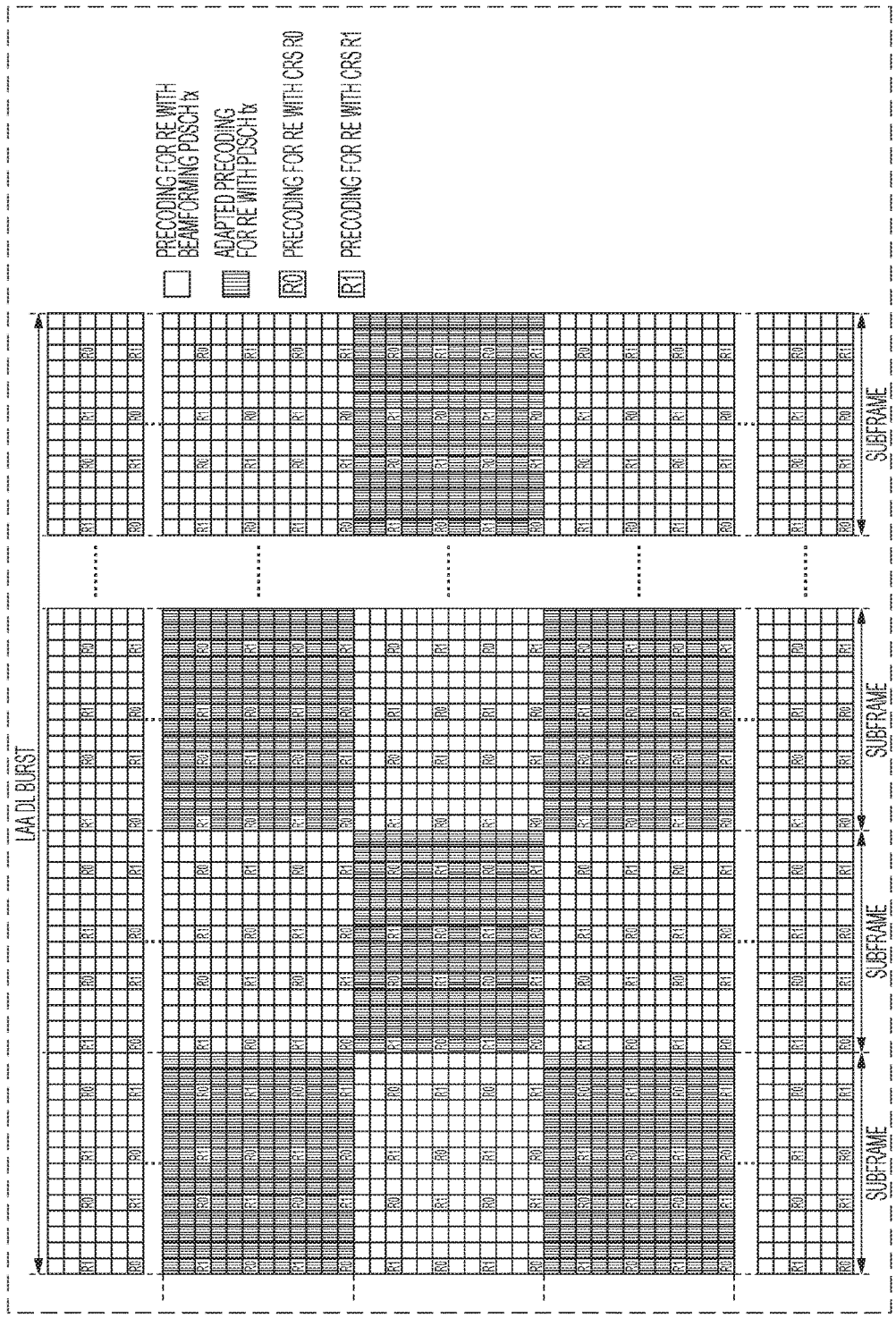
FIG. 28 illustrates resource element mapping over several subframes of an LAA downlink transmission.

However, instead of simply repeating exactly the same resource element mapping for each and every subframe of the LAA downlink transmission, also different resource element mapping(s) of the same or a different concept may be used for some or all of the remaining subframes of the LAA PDSCH transmission. This is exemplarily illustrated in FIG. 28 for the resource element mapping implementation concept discussed for FIG. 25, where the precoding of the resource elements of one resource block changes from subframe to subframe of the LAA downlink data burst.

In the previous discussion, it was only briefly mentioned that the type of precoding to be used for resource elements so as to achieve a different power radiation pattern than the beam directionality to UE1 shall be, e.g., omni-directional or sectorized (e.g., 120°). In the following, different implementations will be presented on how to achieve such a different direction.

An omni-directional radiation pattern can be achieved by transmitting part of the PDSCH transmission over a single antenna port (while transmitting the remaining part of the PDSCH transmission via several antenna ports so as to achieve the beamforming directionality). For example, the antenna port(s) already used for the CRS transmission, i.e., antenna ports $0$, $1$, $2$ or $3$, can be used in this respect; however, also other antenna ports may be used. Clause 6.4 of the standard TS 36.211, current version 12.4.0, describes, for example, that the PDSCH shall be transmitted on antenna ports ($\{0\}$, $\{0, 1\}$, or $\{0, 1, 2, 3\}$) in resource blocks in which UE-specific reference signals (i.e., DMRS) are not transmitted.

Table 6.3.4.2.3-1 in the technical standard 3GPP TS 36.211, current version 12.4.0, illustrates the codebook vectors that can be used for the physical downlink shared channel when transmitting on two antenna ports $0$, $1$, while table 6.3.4.2.3-2 illustrates the codebook vectors available for transmitting on four antenna ports $0, 1, 2, 3$. Correspondingly, the precoding vectors from these tables can be used to achieve the beamforming to UE1 for part of the PDSCH transmission in the usual manner.

However, assuming that the PDSCH is transmitted via more than one antenna port (as in the present scenarios so as to achieve the beamforming to UE 1), none of the available precoding vectors from these tables allows an omnidirectional radiation pattern to be achieved. In particular, as apparent from codebook table 6.3.4.2.3-1 (assuming one layer, i.e., $\upsilon=1$), the corresponding precoding vectors only show a combination of the two antenna ports with different phase adaptations of the two antenna ports $$\left(e.g., \frac{1}{\sqrt{2}}\begin{bmatrix}1\\1\end{bmatrix}; \frac{1}{\sqrt{2}}\begin{bmatrix}1\\-1\end{bmatrix}; \frac{1}{\sqrt{2}}\begin{bmatrix}1\\-j\end{bmatrix}\right);$$

however, corresponding precoding vectors so as to achieve a transmission over a single antenna port $$\left(e.g., \begin{bmatrix}1\\0\end{bmatrix} \text{ or } \begin{bmatrix}0\\1\end{bmatrix}\right)$$

are not provided in these precoding tables. The same basically applies to PDSCH transmissions over four antenna ports; see table 6.3.4.2.3-2 of the standard.

In order to achieve an omni-directional radiation pattern for the other part of the PDSCH transmission, appropriate precoding vectors however need to be used, $$e.g., \begin{bmatrix}1\\0\end{bmatrix} \text{ or } \begin{bmatrix}0\\1\end{bmatrix},$$

for a PDSCH transmission over two antenna ports, A corresponding equivalent solution would be to not apply precoding at all but to make sure that those PDSCH resource elements to which the beamforming precoding shall not be applied are transmitted via only one antenna port, be it antenna ports 0, 1, 2, or 3 or any other available and suitable antenna port.

According to still another solution, a combination of the different available precoding vectors from the codebook can be applied so as to achieve a substantially omni-directional radiation pattern. In more detail, within each subframe of the downlink transmission, resource elements within one OFDM symbol duration shall be respectively processed based on one of the various available precoding vectors, such that over the whole frequency range, i.e., considering all subcarriers within the OFDM symbol duration, the respective power emission patterns of all the resource elements will be superpositioned so as to achieve the substantially omni-directional power radiation pattern. According to one exemplary embodiment, assuming a PDSCH transmission over two antenna ports, the four precoding vectors, i.e., of index 0-3, are used sequentially on resource elements over the whole frequency range within an OFDM symbol duration. The advantage of this is that the precodings already defined in the standard can be reused; i.e., no new precoding vectors need to be added.

For example, considering that resource element mapping example of FIG. 17, at the second OFDM symbol position four resource elements in each resource block are to be precoded differently so as to achieve the different directionality (e.g., omni-directionality). Each of these four resource elements shall be precoded according to one of the four available codebook vectors from table 6.3.4.2.3-1 of TS 36.211. The same or similar is applied to all OFDM symbols containing resource elements to which these different precodings are to be applied (i.e., 2nd, 3rd, 4th, 6th, 7th, 8th to 10th, 12th, and 13th OFDM symbols in this example of FIG. 17) and to all resource blocks. As a result, over the whole frequency range, the differently precoded RE transmissions will sum up so as to achieve a basically omni-directional power radiation pattern.

As mentioned in the background section, reference signals (e.g., CRS) are usually processed so as to have an omni-directional radiation pattern since same are transmitted from a single antenna port (e.g., 0, 1, 2, or 3 for CRS); correspondingly, this could be achieved by not performing precoding on the CRS, which however could also be seen as performing precoding on the CRS with a precoding matrix that ensures that the transmission is only from one antenna port (e.g., using a corresponding precoding vector [1, 0] or [0, 1] assuming two available antenna ports at the eNodeB. Alternatively, in, e.g., sectorized scenarios the CRS are transmitted/precoded so as to have a radiation pattern that merely covers a sector of the cell, e.g., 120°, which may be achieved by corresponding precoding matrices/vectors.

In a similar manner, the precoding to be applied to part of the PDSCH transmission as explained above so as to achieve a different directionality (e.g., omni-directionality) can take the radiation pattern of the reference signals (in the discussed case, the CRS) into account such that the same precoding (or no precoding) is used for that part of the PDSCH transmission as used for transmitting the reference signals (i.e., the CRS, in the discussed case).

In the above discussed exemplary scenarios it was assumed without further discussion that the UE knows how a PDSCH transmission is precoded/transmitted in order to be able to properly receive and decode same, since it is not the focus of the application how the UE knows this. Nevertheless, it is important that the UE has the corresponding information, which at least comprises knowledge about which of the resource elements carrying the PDSCH data are precoded differently and which of them are precoded "normally" (i.e., as indicated by the PMI in the DCI, or indirectly indicated by the DMRS), and also the different precoding(s) that shall be applied.

In the following various different possibilities are presented as to how this may be achieved. According to one implementation, the UE knows beforehand which resource elements with a PDSCH allocation shall not be processed according to the direct PMI indicated to the receiving UE in a DCI via the precoding derived from the DMRS embedded in the PDSCH allocation if PDSCH transmissions are configured for the precoding scheme described in these exemplary embodiments. The precoding scheme according to the various exemplary embodiments could, for example, be configured by means of MAC (medium access control) or RRC (radio resource control) signaling. This can be done already when setting up the data communication between eNB and UE. The use of the precoding scheme would preferably be controlled by the eNB that is in charge of the PDSCH resource allocations. The configuration would be indicated from the eNB to the served UE by transmitting corresponding MAC or RRC information elements to the UE.

In addition to this UE-specific configuration, the use of the precoding scheme described in these exemplary embodiments could also be configured in a cell-specific manner, meaning that all UEs associated to the eNB will be aware of the precoding scheme used for PDSCH transmissions. Such a cell-specific configuration could, for example, be provided by defining a new system information block (SIB) for unlicensed-band operation which contains the indication whether the precoding scheme described in these exemplary embodiments would be used or not following the procedures for system information (SI) acquisition described in sub-clause 5.2.2 of the technical specification 3GPP TS 36.331 (3GPP TS 36.331, "Evolved Universal Terrestrial Radio Access (E-UTRA); Radio Resource Control (RRC); Protocol specification", version 12.4.0), incorporated herein by reference. The pattern of resource elements with PDSCH allocations that shall not be processed according to the direct PMI indicated to the receiving UE in a DCI via the precoding derived from the DMRS embedded in the PDSCH allocation would be described in a technical specification such as, for example, 3GPP TS 36.211, 3GPP TS 36.212 or 3GPP TS 36.213 (3GPP TS 36.213, "Evolved Universal Terrestrial Radio Access (E-UTRA); Physical layer procedures", version 12.4.0). The technical specification could contain a single resource element pattern corresponding preferably to one of the exemplary embodiments described above. Alternatively, the specification could contain multiple resource element patterns, and the precoding scheme configuration could indicate to the served UE which of the patterns described in the technical specification will be used. In correspondence to the previous description, this configuration could be either UE-specific or cell-specific. The configured precoding scheme would be valid, e.g., until the configuration is updated. Such a configuration can be described as semi-static configuration since the configuration will typically be valid for the order of seconds or minutes.

In addition to the semi-static configuration described above, the use of the precoding scheme described above could also be used in a more dynamic and flexible manner by means of indication(s) within a DCI format. In this case, the use of the precoding scheme could be indicated by a corresponding bit field within the DCI. The setting of the bit field would indicate which pattern of resource elements within the PDSCH allocation shall not be processed according to the direct PMI indicated to the receiving UE in a DCI via the precoding derived from the DMRS embedded in the PDSCH allocation. One or multiple resource element patterns, corresponding to one or more of the exemplary embodiments described in this present disclosure, would be defined in a technical specification for LTE, such as 3GPP TS 36.211, 3GPP TS 36.212, or 3GPP TS 36.213.

Figure 1:
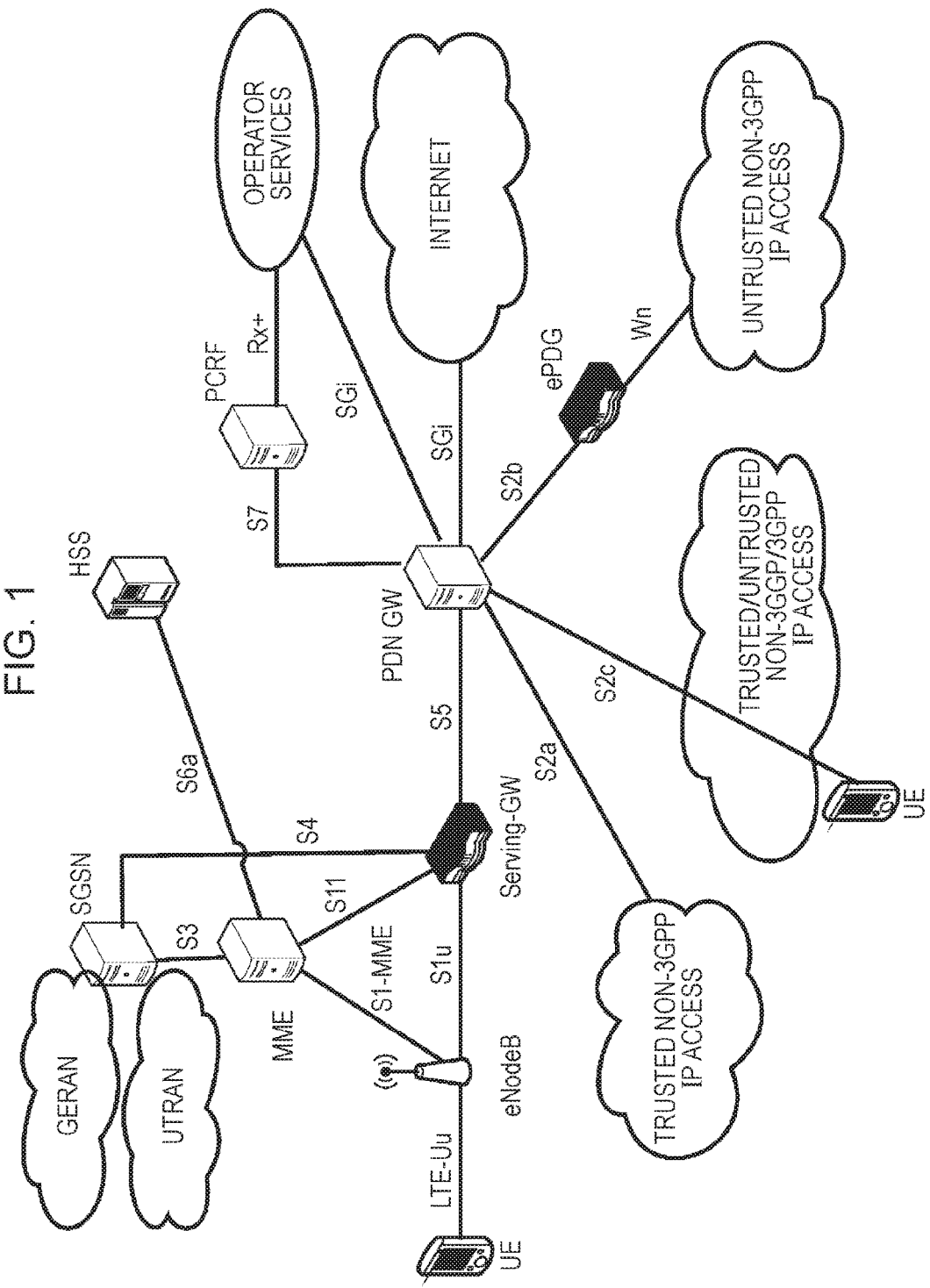
FIG. 1 shows an exemplary architecture of a 3GPP LTE system.
Figure 2:
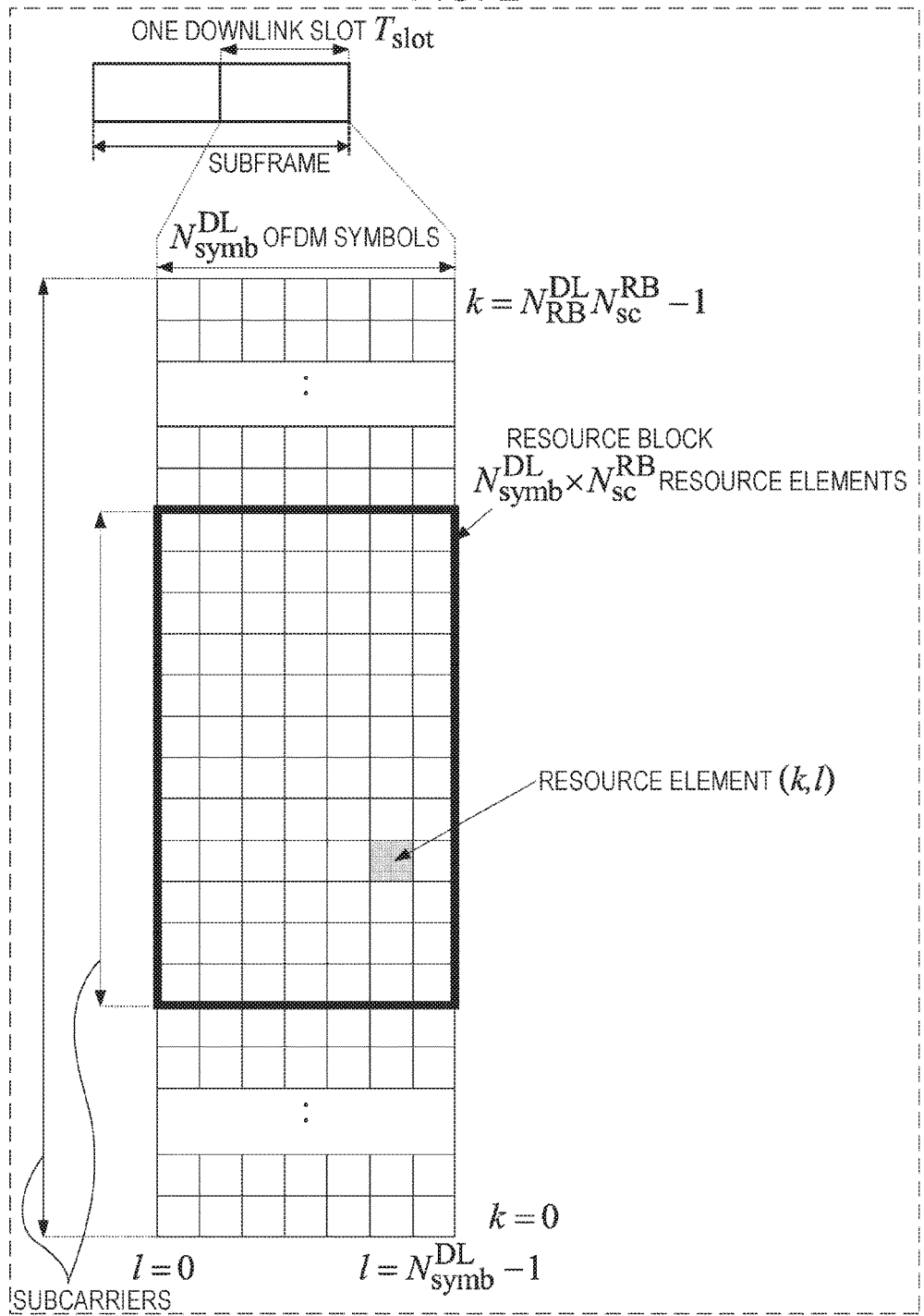
FIG. 2 shows an exemplary downlink resource grid of a downlink slot of a subframe as defined for 3GPP LTE (Release 8/9)
Figure 3:
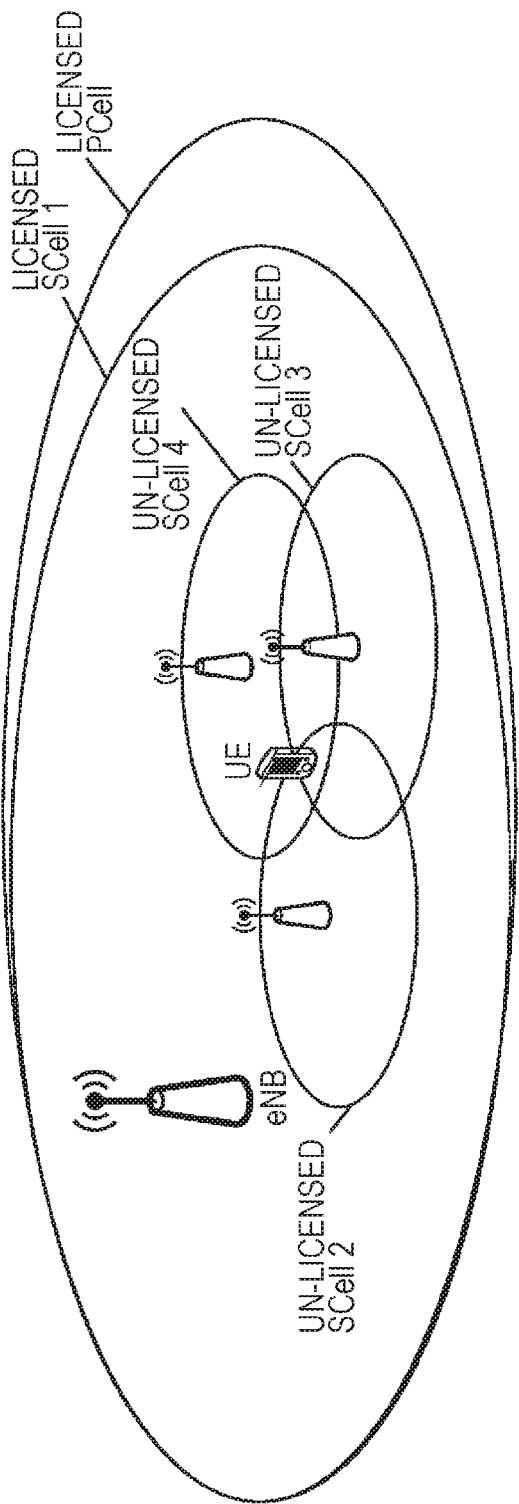
FIG. 3 illustrates an exemplary licensed-assisted access scenario, with various licensed and unlicensed cells.
Figure 4:
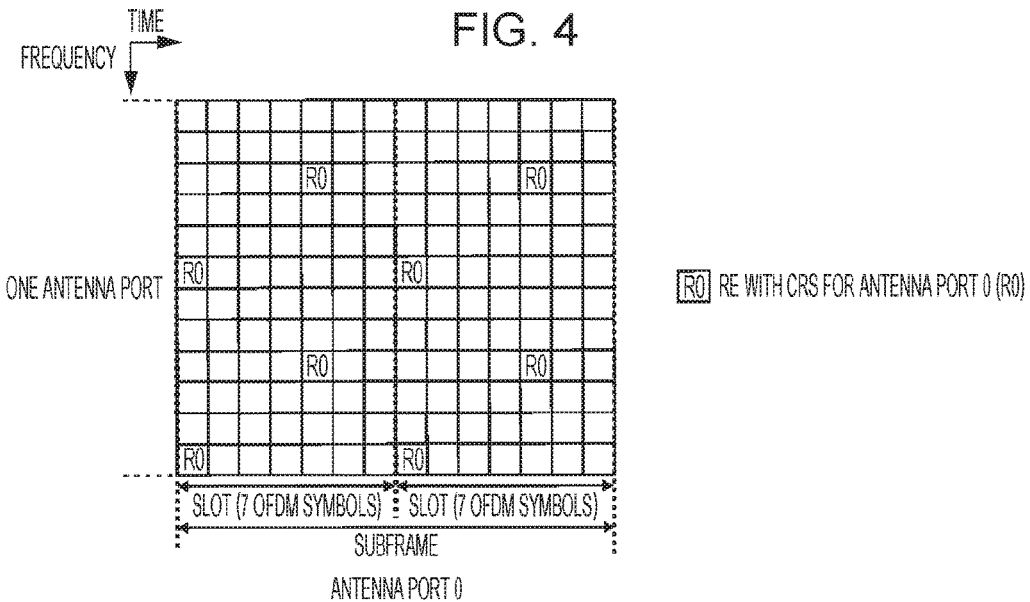
FIG. 4 illustrates that transmission pattern of the cell-specific reference symbols for antenna port 0.

An exemplary DCI implementation could contain a bit field with a size of two bits, where the following interpretation of the bit field setting could be used:
0,0—Conventional PDSCH transmission with a single precoding without the adaptation described in the exemplary embodiments
0,1—Adapted PDSCH transmission with two precodings corresponding to the resource element pattern in, e.g., FIG. 17
1,0—Adapted PDSCH transmission with two precodings corresponding to the resource element pattern in, e.g., FIG. 18
1,1—Adapted PDSCH transmission with two precodings corresponding to the resource element pattern in, e.g., FIG. 19

Alternatively, the DCI implementation could contain just a single bit for differentiation between a conventional PDSCH transmission with a single precoding and an adapted PDSCH transmission with two precodings as described in any of the exemplary embodiments. An exemplary interpretation of the bit setting could be:
0—Conventional PDSCH transmission with a single precoding without the adaptation described in the exemplary embodiments
1—Adapted PDSCH transmission with two precodings corresponding to the resource element pattern in, e.g., FIG. 17

In order to provide the bit or bit field for the DCI, existing DCI formats, as defined in subclause 5.3.3.1 of technical specification 3GPP TS 36.212, incorporated herein by reference, could be extended by a corresponding number of bits. Alternatively, certain bits of DCI formats defined in this technical specification 3GPP TS 36.212 could be reinterpreted for that purpose. A preferred single bit implementation would be using the bit that distinguished between localized and distributed VRB (virtual resource block) assignment used in DCI formats 1A, 1B, and 1D as defined in subclause 5.3.3.1 of technical specification 3GPP TS 36.212, and the bit that distinguishes between resource allocation type 0 and resource allocation type 1 used in DCI formats 1, 2, 2A, 2B, 2C, and 2D as defined in subclause 5.3.3.1 of technical specification 3GPP TS 36.212, The PDSCH allocation for unlicensed band allocations would in this case be fixed to a single allocation type depending on the DCI format, such as, for example, localized VRB assignment for DCI formats 1A, 1B, and 1D and resource allocation type 0 for DCI formats 1, 2, 2A, 2B, 2C, and 2D. Especially under the assumption of only wideband PDSCH allocations for unlicensed-band transmission, this would be an advantageous implementation of the precoding scheme adaptation in existing DCI formats, since wideband allocations, comprising all resource blocks, with resource allocation type 0 and allocation type 1 are anyway the same. The same applies for wideband allocations based on localized and distributed VRB assignment.

In addition, it might be also beneficial for other nodes (e.g., UE2 in the discussed scenario) in the cell to learn about that different precoding of the PDSCH transmission as assumed above. In particular, in case UE2 knows that a part of the PDSCH transmission is precoded so as to achieve an omni-directional power emission pattern (which energy indeed reaches to UE2), UE2 may consider those resource elements when performing CSI or RRM measurement reporting based on CRS or CSI-RS. These measurements could take into account the power level of the adapted resource elements in addition to the power levels of the CRS or CSI-RS. This would increase the number of power level samples within a certain time duration and would therefore increase the reliability of the CRS or CSI-RS-based receive-power-level estimation for CSI or RRM measurement reporting. In case of a cell-specific configuration of the precoding adaptation scheme as described above, the UE that performs CSI or RRM measurements would directly be aware of the configuration. In case of dynamic and flexible use of the precoding adaptation for PDSCH transmissions, the UE that is requested to perform CSI or RRM measurements would have to be informed dynamically about the resource element pattern that is used for the precoding adaptation in a subframe that will be used for CSI or RRM measurements.

A preferable implementation for the aperiodic CSI reporting is the extension of the CSI request field in DCI format 0 and DCI format 4, as specified in subclause 5.3.3.1 of technical specification 3GPP TS 36.212, incorporated herein by reference, by one or multiple bits that will indicate which resource element pattern shall be assumed by the UE in the reference resource for the CSI report.

Further Embodiments

According to a first aspect, a method is provided for transmitting and receiving a beamformed data transmission transmitted from a radio base station to a user equipment over an unlicensed band in a mobile communication system. The data transmission is transmitted by the radio base station within one or more resource blocks of a subframe where each resource block is composed of a plurality of resource elements. The beamformed data transmission is generated by the radio base station by 1) applying a first precoding for generating a beam directionality towards the user equipment to a subset of all the resource elements used for transmitting the data transmission in the subframe, and 2) applying a second precoding, different from the first precoding, to the remaining resource elements used for transmitting the data transmission in the subframe so as to achieve a radiation pattern different from the beam directionality towards the user equipment.

According to an advantageous variant of the first aspect which can be used in addition to the above, the subset of resource elements to which the first precoding is applied is composed of one or more resource elements of each resource block used for transmitting the data transmission in the subframe. Correspondingly, the remaining resource elements to which the second precoding is applied are composed of the remaining resource elements of each resource block used for transmitting the data transmission in the subframe. Optionally, the subset of resource elements to which the first precoding is applied is such that particular subcarriers of each resource block in the subframe are not included. Optionally, the one or more resource elements of each resource block are composed of one or more resource elements of one or more OFDM, Orthogonal Frequency- Division Multiplexing, symbols that do not comprise resource elements used for transmitting a cell-specific reference signal.

According to an advantageous variant of the first aspect which can be used alternatively to the above, the subset of resource elements to which the first precoding is applied is composed of the resource elements of one or more resource blocks used for transmitting the data transmission in the subframe. Correspondingly, the remaining resource elements to which the second precoding is applied are composed of all the resource elements of the remaining resource blocks used for transmitting the data transmission in the subframe. Optionally, the one or more resource blocks to which the first precoding is applied and the remaining resource blocks to which the second precoding is applied in the subframe alternate in the frequency domain.

According to an advantageous variant of the first aspect which can be used alternatively to the above, the subset of resource elements to which the first precoding is applied is composed of all the resource elements of one or more resource blocks used for transmitting the data transmission in the subframe and of all resource elements of one or more OFDM symbols of the remaining resource blocks used for transmitting the data transmission in the subframe. Correspondingly, the remaining resource elements to which the second precoding is applied are composed of all the resource elements of the remaining OFDM symbols of the remaining resource blocks used for transmitting the data transmission in the subframe. Optionally, the remaining OFDM symbols of the remaining resource blocks that include resource elements to which the second precoding is applied are those that do not comprise resource elements used for transmitting a cell-specific reference signal.

According to an advantageous variant of the first aspect which can be used in addition or alternatively to the above, the first precoding applied to the subset of the resource elements used for transmitting the data transmission in the subframe is a precoding matrix from a precoding codebook such that the subset of resource elements is transmitted from at least two antenna ports to achieve the beam directionality towards the user equipment.

According to an advantageous variant of the first aspect which can be used in addition or alternatively to the above, the second precoding applied to the remaining resource elements used for transmitting the data transmission in the subframe is either 1) no precoding or a precoding matrix for achieving an omni-directional radiation pattern such that the remaining resource elements are transmitted via one antenna port, or 2) several different precodings for achieving a beam directionality so as to overall achieve a substantially omni-directional radiation pattern. Optionally, the different precodings are cyclically selected from a corresponding precoding codebook.

According to an advantageous variant of the first aspect which can be used in addition or alternatively to the above, cell-specific reference signals are transmitted by the radio base station within the subframe over the unlicensed band, the cell-specific reference signals being transmitted with a particular radiation pattern. The second precoding applied to the remaining resource elements used for transmitting the data transmission in the subframe is such that the radio pattern achieved for the remaining resource elements at least covers the particular radiation pattern of the cell-specific reference signal transmission. Optionally, the particular radiation pattern can be an omni-directional radiation pattern covering all of a cell or a sectorized radiation pattern covering only a sector of a cell. Optionally, the second precoding is the same as a precoding applied to the cell-specific reference signals. Optionally, the cell-specific reference signals are at least one of a common reference signal, CRS, a channel state information reference signal, CSI-RS, and a discovery reference signal, DSR.

According to an advantageous variant of the first aspect which can be used in addition or alternatively to the above, the radio base station and the user equipment have information as to which resource elements used to transmit the data transmission are to be precoded according to the first precoding and which resource elements used to transmit the data transmission are to be precoded according to the second precoding. Optionally, this is according to a configuration by higher layers or a pre-configuration known to both the radio base station and the use equipment.

According to a first aspect, a radio base station is provided for transmitting a beamformed data transmission transmitted from the radio base station to a user equipment over an unlicensed band in a mobile communication system. The data transmission is transmitted by the radio base station within one or more resource blocks of a subframe where each resource block is composed of a plurality of resource elements. The radio base station includes a transmitter and a processor so as to generate the beamformed data transmission by 1) applying a first precoding for generating a beam directionality towards the user equipment to a subset of all the resource elements used for transmitting the data transmission in the subframe, and 2) applying a second precoding, different from the first precoding, to the remaining resource elements used for transmitting the data transmission in the subframe so as to achieve a radiation pattern different from the beam directionality towards the user equipment.

According to a first aspect, a user equipment is provided for receiving a beamformed data transmission transmitted from a radio base station to the user equipment over an unlicensed band in a mobile communication system. The data transmission is transmitted by the radio base station within one or more resource blocks of a subframe where each resource block is composed of a plurality of resource elements. The beamformed data transmission is generated by the radio base station by 1) applying a first precoding for generating a beam directionality towards the user equipment to a subset of all the resource elements used for transmitting the data transmission in the subframe, and 2) applying a second precoding, different from the first precoding, to the remaining resource elements used for transmitting the data transmission in the subframe so as to achieve a radiation pattern different from the beam directionality towards the user equipment. The user equipment includes a receiver and a processor so as to receive the beamformed data transmission by applying the first precoding to the subset of all the resource elements used for transmitting the data transmission in the subframe, and by applying the second precoding to the remaining resource elements used for transmitting the data transmission in the subframe.

According to an advantageous variant of the first aspect which can be used in addition to the above, the subset of resource elements to which the first precoding is applied is composed of one or more resource elements of each resource block used for transmitting the data transmission in the subframe. Correspondingly, the remaining resource elements to which the second precoding is applied are composed of the remaining resource elements of each resource block used for transmitting the data transmission in the subframe. Optionally, the subset of resource elements to which the first precoding is applied is such that particular subcarriers of each resource block in the subframe are not included. Optionally, the one or more resource elements of each resource block are composed of one or more resource elements of one or more OFDM, Orthogonal Frequency-Division Multiplexing, symbols that do not comprise resource elements used for transmitting a cell-specific reference signal.

According to an advantageous variant of the first aspect which can be used alternatively to the above, the subset of resource elements to which the first precoding is applied is composed of the resource elements of one or more resource blocks used for transmitting the data transmission in the subframe. Correspondingly, the remaining resource elements to which the second precoding is applied are composed of all the resource elements of the remaining resource blocks used for transmitting the data transmission in the subframe.

According to an advantageous variant of the first aspect which can be used alternatively to the above, the subset of resource elements to which the first precoding is applied is composed of all the resource elements of one or more resource blocks used for transmitting the data transmission in the subframe and of all resource elements of one or more OFDM symbols of the remaining resource blocks used for transmitting the data transmission in the subframe. Correspondingly, the remaining resource elements to which the second precoding is applied are composed of all the resource elements of the remaining OFDM symbols of the remaining resource blocks used for transmitting the data transmission in the subframe. Optionally, the remaining OFDM symbols of the remaining resource blocks that include resource elements to which the second precoding is applied are those that do not comprise resource elements used for transmitting a cell-specific reference signal.

According to an advantageous variant of the first aspect which can be used alternatively or in addition to the above, the second precoding applied to the remaining resource elements used for transmitting the data transmission in the subframe is either 1) no precoding or a precoding matrix for achieving an omni-directional radiation pattern such that the remaining resource elements are transmitted via one antenna port, or 2) several different precodings for achieving a beam directionality so as to overall achieve a substantially omni-directional radiation pattern. Optionally, the different precodings are cyclically selected from a corresponding precoding codebook.

According to an advantageous variant of the first aspect which can be used alternatively or in addition to the above, the receiver of the user equipment receives cell-specific reference signals transmitted by the radio base station within the subframe over the unlicensed band, the cell-specific reference signals being transmitted with a particular radiation pattern. The second precoding applied to the remaining resource elements used for transmitting the data transmission in the subframe is such that the radio pattern achieved for the remaining resource elements at least covers the particular radiation pattern of the cell-specific reference signal transmission. Optionally, the particular radiation pattern can be an omni-directional radiation pattern covering all of a cell or a sectorized radiation pattern covering only a sector of a cell. Optionally, the second precoding is the same as a precoding applied to the cell-specific reference signals. Optionally, the cell-specific reference signals are at least one of a common reference signal, CRS, a channel state information reference signal, CSI-RS, and a discovery reference signal, DSR.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit, They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

What is claimed is:

1. A method for transmitting and receiving a beamformed data transmission transmitted from a radio base station to a user equipment over an unlicensed band in a mobile communication system, wherein the beamformed data transmission is transmitted by the radio base station within one or more resource blocks of a subframe where each resource block is composed of a plurality of resource elements, wherein the beamformed data transmission is generated by the radio base station by:
applying a first precoding that generates a beam directionality towards the user equipment to a subset of the resource elements in the subframe; and
applying a second precoding, different from the first precoding, to the resource elements other than the subset of the resource elements in the subframe, that generates a radiation pattern different from the beam directionality towards the user equipment,
wherein the resource elements other than the subset of the resource elements to which the second precoding is applied are not used to transmit a cell-specific reference signal.

2. The method according to claim 1, wherein the subset of resource elements to which the first precoding is applied is composed of one or more resource elements of each resource block in the subframe, and the resource elements other than the subset of the resource elements to which the second precoding is applied are composed of the resource elements other than the subset of the resource elements of each resource block in the subframe,
wherein the subset of resource elements to which the first precoding is applied is such that particular subcarriers of each resource block in the subframe are not included, and
wherein the one or more resource elements of each resource block are composed of one or more resource elements of one or more OFDM, Orthogonal Frequency-Division Multiplexing, symbols that do not comprise resource elements used for transmitting the cell-specific reference signal.

3. The method according to claim 1, wherein the subset of resource elements to which the first precoding is applied is composed of the resource elements of the one or more resource blocks in the subframe, and the resource elements other than the subset of the resource elements to which the second precoding is applied are composed of all the resource elements of at least one resource block other than the one or more resource blocks in the subframe, wherein the one or more resource blocks to which the first precoding is applied and the at least one resource block other than the one or more resource blocks to which the second precoding is applied in the subframe alternate in the frequency domain.

4. The method according to claim 1, wherein the subset of resource elements to which the first precoding is applied is composed of all the resource elements of one or more resource blocks in the subframe and of all resource elements of one or more OFDM symbols of at least one resource block other than the one or more resource blocks in the subframe, and the resource elements other than the subset of the resource elements to which the second precoding is applied are composed of all the resource elements of the at least one resource bock other than the one or more OFDM symbols of the at least one resource block other than the one or more resource blocks in the subframe, wherein the at least one OFDM symbol other than the one or more OFDM symbols of the at least one resource block other than the one or more resource blocks that include resource elements to which the second precoding is applied are those that do not comprise resource elements used for transmitting the cell-specific reference signal.

5. The method according to claim 1, wherein the first precoding applied to the subset of the resource elements in the subframe is:
a precoding matrix from a precoding codebook such that the subset of resource elements is transmitted from at least two antenna ports to achieve the beam directionality towards the user equipment.

6. The method according to claim 1, wherein the second precoding applied to the resource elements other than the subset of the resource elements in the subframe is:
no precoding or a precoding matrix for achieving an omni-directional radiation pattern such that the resource elements other than the subset of the resource elements are transmitted via one antenna port, or
several different precodings for achieving a beam directionality so as to overall achieve a substantially omni-directional radiation pattern, wherein the different precodings are cyclically selected from a corresponding precoding codebook.

7. The method according to claim 1, wherein cell-specific reference signals are transmitted by the radio base station within the subframe over the unlicensed band, the cell-specific reference signals being transmitted with a particular radiation pattern,
wherein the second precoding applied to the resource elements other than the subset of the resource elements in the subframe is such that the radio pattern achieved for the resource elements other than the subset of the resource elements at least covers the particular radiation pattern of the cell-specific reference signal transmission,
wherein the particular radiation pattern can be an omni-directional radiation pattern covering all of a cell or a sectorized radiation pattern covering only a sector of a cell,
wherein the second precoding is the same as a precoding applied to the cell-specific reference signals, and
wherein the cell-specific reference signals are at least one of a common reference signal, CRS, a channel state information reference signal, CSI-RS, and a discovery reference signal, DSR.

8. The method according to claim 1, wherein the radio base station and the user equipment have information as to which resource elements used to transmit the data transmission are to be precoded according to the first precoding and which resource elements used to transmit the data transmission are to be precoded according to the second precoding, according to a configuration by higher layers or a pre-configuration known to both the radio base station and the use equipment.

9. A radio base station for transmitting a beamformed data transmission transmitted from the radio base station to a user equipment over an unlicensed band in a mobile communication system, wherein the beamformed data transmission is transmitted by the radio base station within one or more resource blocks of a subframe where each resource block is composed of a plurality of resource elements, the radio base station comprising:
a transmitter; and
a processor, which in operation, causes the transmitter to generate the beamformed data transmission by:
applying a first precoding that causes the transmitter to generate a beam directionality towards the user equipment to a subset of the resource elements in the subframe; and
applying a second precoding, different from the first precoding, to resource elements other than the subset of the resource elements in the subframe, that causes the transmitter to generate a radiation pattern different from the beam directionality towards the user equipment,
wherein the resource elements other than the subset of the resource elements to which the second precoding is applied are not used to transmit a cell-specific reference signal.

10. A user equipment for receiving a beamformed data transmission transmitted from a radio base station to the user equipment over an unlicensed band in a mobile communication system, wherein the data transmission is transmitted by the radio base station within one or more resource blocks of a subframe where each resource block is composed of a plurality of resource elements, wherein the beamformed data transmission is generated by the radio base station by: applying a first precoding that generates a beam directionality towards the user equipment to a subset of the resource elements in the subframe; and applying a second precoding, different from the first precoding, to resource elements other than the subset of the resource elements in the subframe, that generates a radiation pattern different from the beam directionality towards the user equipment, the user equipment comprising:

a receiver, which in operation, receives the beamformed data transmission; and a processor, which in operation, applies the first precoding to the subset of the resource elements in the subframe, and applies the second precoding to the resource elements other than the subset of the resource elements in the subframe, wherein the resource elements other than the subset of the resource elements to which the second precoding is applied are not used to transmit a cell-specific reference signal.

11. The user equipment according to claim 10, wherein the subset of resource elements to which the first precoding is applied is composed of one or more resource elements of each resource block in the subframe, and the resource elements other than the subset of the resource elements to which the second precoding is applied are composed of the resource elements other than the subset of the resource elements of each resource block in the subframe, wherein the subset of resource elements to which the first precoding is applied is such that particular subcarriers of each resource block in the subframe are not included, and wherein the one or more resource elements of each resource block are composed of one or more resource elements of one or more OFDM, Orthogonal Frequency-Division Multiplexing, symbols that do not comprise resource elements used for transmitting the cell-specific reference signal.

12. The user equipment according to claim 10, wherein the subset of resource elements to which the first precoding is applied is composed of the resource elements of one or more resource blocks in the subframe, and the resource elements other than the subset of the resource elements to which the second precoding is applied are composed of all the resource elements of at least one bock other than the one or more resource blocks in the subframe.

13. The user equipment according to claim 10, wherein the subset of resource elements to which the first precoding is applied is composed of all the resource elements of one or more resource blocks in the subframe and of all resource elements of one or more OFDM symbols of at least one block other than the one or more resource blocks in the subframe, and the resource elements other than the subset of the resource elements to which the second precoding is applied are composed of all the resource elements of at least one OFDM symbol other than the one or more OFDM symbols of the at least one block other than the one or more resource blocks in the subframe, wherein the at least one OFDM symbol other than the one or more OFDM symbols of the at least one resource block other than the one or more resource blocks that include resource elements to which the second precoding is applied are those that do not comprise resource elements used for transmitting the cell-specific reference signal.

14. The user equipment according to claim 10, wherein the second precoding applied to the resource elements other than the subset of the resource elements in the subframe is:

no precoding or a precoding matrix for achieving an omni-directional radiation pattern such that the resource elements other than the subset of the resource elements are transmitted via one antenna port, or several different precodings for achieving a beam directionality so as to overall achieve a substantially omni-directional radiation pattern, wherein the different precodings are cyclically selected from a corresponding precoding codebook.

15. The user equipment according to claim 10, wherein the receiver is adapted to receive cell-specific reference signals transmitted by the radio base station within the subframe over the unlicensed band, the cell-specific reference signals being transmitted with a particular radiation pattern, wherein the second precoding applied to the resource elements other than the subset of the resource elements in the subframe is such that the radio pattern achieved for the resource elements other than the subset of the resource elements at least covers the particular radiation pattern of the cell-specific reference signal transmission, wherein the particular radiation pattern can be an omni-directional radiation pattern covering all of a cell or a sectorized radiation pattern covering only a sector of a cell, wherein the second precoding is the same as a precoding applied to the cell-specific reference signals, and wherein the cell-specific reference signals are at least one of a common reference signal, CRS, a channel state information reference signal, CSI-RS, and a discovery reference signal, DSR.

* * * * *